United States Patent
Sarrafzadeh et al.

(10) Patent No.: US 10,503,967 B2
(45) Date of Patent: Dec. 10, 2019

(54) FAST BEHAVIOR AND ABNORMALITY DETECTION

(71) Applicant: THE REGENTS OF THE UNIVERSITY OF CALIFORNIA, Oakland, CA (US)

(72) Inventors: Majid Sarrafzadeh, Anaheim Hills, CA (US); Foad Dabiri, San Francisco, CA (US); Hyduke Noshadi, Sherman Oaks, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 848 days.

(21) Appl. No.: 14/949,634

(22) Filed: Nov. 23, 2015

(65) Prior Publication Data

US 2016/0148103 A1     May 26, 2016

Related U.S. Application Data

(60) Provisional application No. 62/082,923, filed on Nov. 21, 2014.

(51) Int. Cl.
  *G06K 9/00* (2006.01)
  *G06K 9/46* (2006.01)
  *G06N 20/00* (2019.01)

(52) U.S. Cl.
  CPC ......... *G06K 9/00348* (2013.01); *G06K 9/469* (2013.01); *G06N 20/00* (2019.01)

(58) Field of Classification Search
  USPC .......................................................... 706/46
  See application file for complete search history.

(56) References Cited

U.S. PATENT DOCUMENTS 8,423,298 B2 *   4/2013   Fernandez ........... A61B 5/0215
                                                          702/20
8,762,379 B2 *   6/2014   Birdwell ........... G06F 17/30442
                                                          707/737

(Continued)

FOREIGN PATENT DOCUMENTS

KR   10-2010-0127148 A   12/2010
WO   WO-2014/118767      8/2014

OTHER PUBLICATIONS

Science Direct, Elsevier, Computers in Biology and Medicine, vol. 95, Apr. 1, 2018, pp. 261-270, Graph-based representation of behavior in detection and prediction of daily living activities, Piotr Augustyniak, Grazyna Slusarczyk.*

(Continued)

*Primary Examiner* — Michael B Holmes
(74) *Attorney, Agent, or Firm* — Foley & Lardner LLP; Cliff Z. Liu

(57) ABSTRACT

A system includes an interface configured to receive time series data representing information from a plurality of sensors, and a processor configured to construct a behavior model based on the time series data. The processor identifies features in the time series data, divides the time series data of each of the identified features into segments, and extracts feature components from the segments. The processor further constructs a plurality of state graphs, each state graph including components connected by weighted edges, constructs a behavior graph, wherein the state graphs form vertices of the behavior graph, clusters the state graphs in the behavior graph; and selects a representative state graph from each cluster, wherein the behavior model includes the selected state graphs.

19 Claims, 14 Drawing Sheets

(56) References Cited

U.S. PATENT DOCUMENTS

| | | | |
|---|---|---|---|
| 9,110,836 B1* | 8/2015 | Fernandez | A61B 5/0215 |
| 9,111,026 B1* | 8/2015 | Fernandez | A61B 5/0215 |
| 9,317,540 B2* | 4/2016 | Rouat | G06K 9/468 |
| 9,690,913 B2* | 6/2017 | Balu | G06Q 50/18 |
| 9,719,147 B1* | 8/2017 | Fernandez | A61B 5/0215 |
| 9,727,546 B1* | 8/2017 | Noshadi | H04N 1/00167 |
| 9,754,081 B2* | 9/2017 | Ghasemzadeh | G16H 50/50 |
| 9,833,196 B2* | 12/2017 | Sarrafzadeh | A61B 5/1118 |
| 9,888,868 B2* | 2/2018 | Sarrafzadeh | A61B 5/1038 |
| 9,891,701 B2* | 2/2018 | Sarrafzadeh | A61B 5/1112 |
| 9,901,815 B2* | 2/2018 | Sarrafzadeh | G06Q 50/10 |
| 9,980,673 B2* | 5/2018 | Sarrafzadeh | A61B 5/445 |
| 10,188,340 B2* | 1/2019 | Sarrafzadeh | A61B 5/445 |
| 10,201,746 B1* | 2/2019 | Sarrafzadeh | A63F 13/00 |
| 10,265,029 B2* | 4/2019 | Sarrafzadeh | A61B 5/02055 |
| 10,275,606 B2* | 4/2019 | Kulick | G06F 21/6245 |
| 10,303,756 B2* | 5/2019 | Noshadi | G06F 17/241 |
| 2005/0233860 A1 | 10/2005 | Inoue | |
| 2006/0158173 A1 | 7/2006 | Takiguchi | |
| 2010/0305480 A1 | 12/2010 | Fu et al. | |
| 2011/0160555 A1* | 6/2011 | Reifman | A61B 5/14532 600/365 |
| 2013/0054603 A1* | 2/2013 | Birdwell | G06K 9/6224 707/738 |
| 2013/0159310 A1* | 6/2013 | Birdwell | G06F 17/30442 707/737 |
| 2014/0114975 A1* | 4/2014 | Rouat | G06F 7/24 707/737 |
| 2014/0201120 A1 | 7/2014 | Lydon et al. | |
| 2014/0297546 A1* | 10/2014 | Birdwell | G06F 17/30442 705/318 |
| 2015/0317589 A1* | 11/2015 | Anderson | G06Q 10/08 705/7.25 |
| 2015/0379061 A1* | 12/2015 | Paraschivescu | G06F 17/30551 707/695 |

OTHER PUBLICATIONS

ACM Digital Library, Graph-Based User Behavior Modeling: From Prediction to Fraud Detection, Alex Beutel, Carnegie Mellon University, Leman Akoglu, Stony Brook University, Christos Faloutsos, Carnegie Mellon University, KDD '15 Proceedings of the 21th ACM SIGKDD International Conference on Knowledge Discovery and Data Mining pp. 2309-2310.*

ACM Digital Library, Modeling dynamic behavior in large evolving graphs, Ryan A. Rossi, Purdue University, Brian Gallagher, Lawrence Livermore National Laboratory, Jennifer Neville, Purdue University, Keith Henderson, Lawrence Livermore National Laboratory, WSDM '13 Proceedings sixth ACM intl conference on Web search and data mining, pp. 667-676.*

Coupled hidden Markov models for complex action recognition Matthew Brand, Nuria Oliver, and Alex Pentland brand,nuria,sandy @ media.mit.edu Vision and Modeling Group, MIT Media Lab Cambridge, MA 02139, 1063-6919/97 1997 IEEE.*

ScienceDirect Elsevior Pattern Recognition Letters vol. 31, Issue 8, Jun. 1, 2010, pp. 651-666 Data clustering: 50 years beyond K-means Anil K. Jain.*

IEEE Outlier Detection for Temporal Data: A Survey Manish Gupta; Jing Gao; Charu C. Aggarwal; Jiawei Han Published in: IEEE Transactions on Knowledge and Data Engineering ( vol. 26 , Issue: 9 , Sep. 2014) pp. 2250-2267.*

ACM Digital Library Accurate online power estimation and automatic battery behavior based power model generation for smartphoneshang et al. CODES/ISSS '10 Proceedings of the eighth IEEE/ACM/IFIP international conference on Hardware/software codesign and system synthesis pp. 105-114.*

International Search Report and Written Opinion for International Application No. PCT/US2015/062204 dated Mar. 28, 2016.

* cited by examiner

US 10,503,967 B2

FAST BEHAVIOR AND ABNORMALITY DETECTION

CROSS-REFERENCE TO RELATED PATENT APPLICATION

This application claims the benefit of and priority to U.S. Provisional Patent Application No. 62/082,923, filed on Nov. 21, 2014, to Sarrafzadeh et al., titled "Fast Behavior and Abnormality Detection," the content of which is incorporated herein by reference in its entirety.

BACKGROUND

Supervised techniques for detecting activities and identifying known behaviors, or abnormal behaviors, involve training for specific persons or environments. Different techniques are needed for real-time monitoring without training on specific persons or environments.

SUMMARY

A system includes an interface configured to receive time series data representing information from a plurality of sensors, and a processor configured to construct a behavior model based on the time series data. The processor identifies features in the time series data, divides the time series data of each of the identified features into segments, and extracts feature components from the segments. The processor further constructs a plurality of state graphs, each state graph including components connected by weighted edges, constructs a behavior graph, wherein the state graphs form vertices of the behavior graph, clusters the state graphs in the behavior graph; and selects a representative state graph from each cluster, wherein the behavior model includes the selected state graphs.

A method includes receiving time series data representing information from multiple sensors; identifying features in the time series data; extracting components of the features; and identifying similarities between the components. The method further includes constructing state graphs, each state graph including similar components; constructing a behavior graph of similar state graphs; organizing the state graphs in the behavior graph into clusters; and selecting a representative state graph from each cluster, the representative state graphs constructing a behavior model.

Another method includes receiving training time series data representing information from multiple sensors; identifying features in the training time series data; extracting components of the features; and identifying similarities between the components. The method further includes constructing state graphs, each state graph including similar components; constructing a behavior graph of similar state graphs; organizing the state graphs in the behavior graph into clusters; and selecting a representative state graph from each cluster, the representative state graphs constructing a behavior model. The method further includes receiving incoming time series data representing information from one or more sensors that monitor an individual; applying the behavior model to the incoming time series data to predict a medical event or condition of the individual; and generating an alert on the medical condition or event, wherein the alert activates a user interface of a computing device to cause visualization of the medical event or condition to display on the computing device.

DETAILED DESCRIPTION

Figure 1:
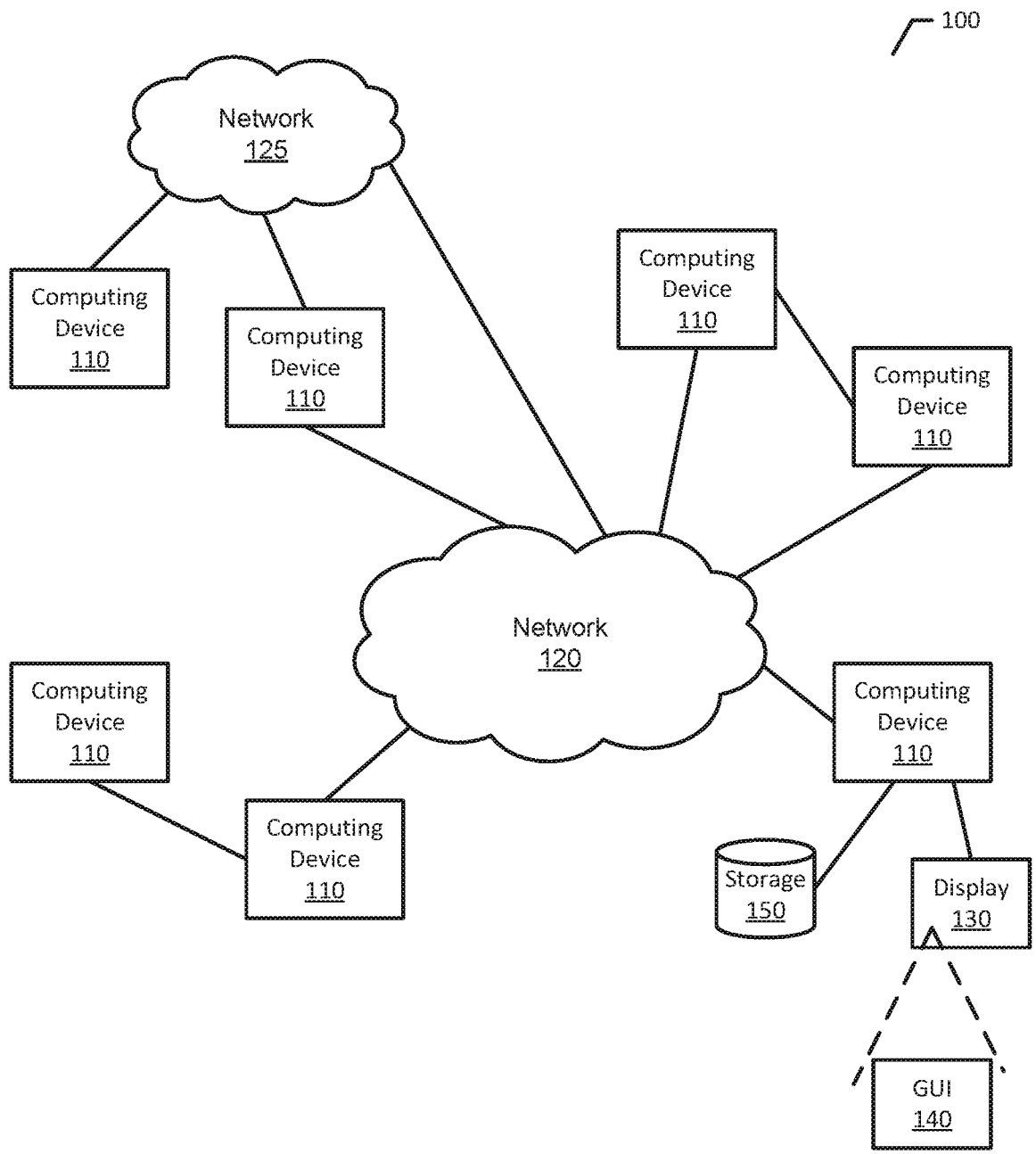
FIG. 1 is a representation of an example of a system in which behavior and abnormality detection may be implemented.

Supervised techniques have been used to discover specific activity or behavioral patterns and to identify certain abnormalities, actions and activities. However, implementing supervised techniques in a real world setting is not very practical or effective. For example, supervised techniques are limited to identifying and discovering activities that are within the knowledge of the supervisor of the techniques. A supervisor in this context is a person or a system that compares an individual's activity or behavior to an activity or behavior observed at a previous time. However, observing (and remembering) all activity or behavioral patterns for an individual in all environments is not feasible. Further, there is a variation of the activity or behavior patterns of each individual such that observation at one time may not be representative of activity or behavior at another time, making the universe of activity or behavior patterns of the individual more complex and vast. Therefore, the supervised techniques are limited to defined environments.

Further, detection of an abnormality in many physiological or health monitoring techniques is determined by a deviance from a usual activity or behavior pattern of an individual. While an activity or behavior pattern may identify abnormal activity or behavior for that specific individual, the same pattern might represent normal activity or behavior for another individual. Thus, supervised techniques are further limited to detection of abnormality of an individual by way of comparison to past activity or behavior of that individual, such that the supervised techniques may not be extendable to detection of abnormality in any other individual.

Unsupervised techniques, in contrast, are not specific to an individual or an environment. Unsupervised techniques are capable of differentiating normal versus abnormal activity or behavior patterns by observing physiological trends in data. Unsupervised techniques are further capable of leveraging expert knowledge to study variation of previously known activities or behaviors to discover abnormal patterns. Accordingly, an unsupervised technique can adapt itself to an individual or an environment.

In the present disclosure, an unsupervised technique is described for discovery and classification of activities or behaviors using multi-dimensional time series signals recorded from wearable sensing systems. The technique takes advantage of intrinsic properties in recorded time series sensor data imposed by human physiological behavior, and builds behavior models for human activity. Collected multi-dimensional time series data is transformed into a combinatorial space, and combinatorial optimization techniques are used for discovery of actions, activities, behaviors and abnormalities. The described technique builds human activity models with low computational complexity.

One example of how the described technique may be useful is in monitoring temporal characteristics of human locomotion, activities, and posture allocation. Temporal characteristics of human walking can reveal signs of heart attack, stroke, alcohol intoxication or imbalance. High variability in temporal characteristic of human walking activity is a sign of instability and is an indicator of future falls. Another example is the monitoring of activities and posture allocation to estimate energy expenditure, which can be used in obesity prevention and treatment. In the present disclosure, the effectiveness of the described technique is illustrated using data collected from a shoe based sensing system, but the technique is effective for many other sensing systems as well.

FIG. 1 is a representation of an example of a system 100 in which behavior and abnormality detection may be implemented. System 100 includes multiple computing devices 110, and networks 120 and 125. Components of system 100 can realize various different computing model infrastructures, such as web services, distributed computing and grid computing infrastructures.

Computing device 110 may be one of many types of apparatus, device, or machine for processing data, including by way of non-limiting example a personal digital assistant (PDA), a smartphone, a smart watch, a tablet computer, a netbook, a notebook computer, a laptop computer, a desktop computer or a server. Additional information regarding computing devices is illustrated and described with respect to FIG. 2.

Networks 120 and 125 represent any type of network, such as a wide area network or a local area network, or a combination of networks. Networks 120 and 125 may include one or more of analog and digital networks, wide area and local area networks, wired and wireless networks, and broadband and narrowband networks. In some implementations, network 120 and/or network 125 may include a cable (e.g., coaxial metal cable), satellite, fiber optic, or other transmission media.

As illustrated in FIG. 1, computing device 110 may be in communication with another computing device 110 directly, or via one or more networks 120 and/or 125.

One computing device 110 of FIG. 1 is illustrated as being in communication with a display 130 having a graphical user interface (GUI) 140, and further illustrated as being in communication with a storage 150. Although one computing device 110 is illustrated as being in communication with display 130 (with GUI 140) and storage 150, other computing devices 110 may also be in communication with one or more displays 130 and one or more storages 150. Further, displays 130 and storages 150 may be shared by more than one computing device 110.

Display 130 is a viewing device such as monitor or screen attached to computing device 110 for providing a user interface to computing device 110. GUI 140 is a graphical form of user interface. Information may be provided to GUI 140 for presentation to a user.

Storage 150 represents one or more memories external to computing device 110 for storing information, where information may be data or computer code.

The behavior and abnormality detection of the present disclosure may be implemented as computer-readable instructions in storage 150, executed by computing device 110.

Figure 2:
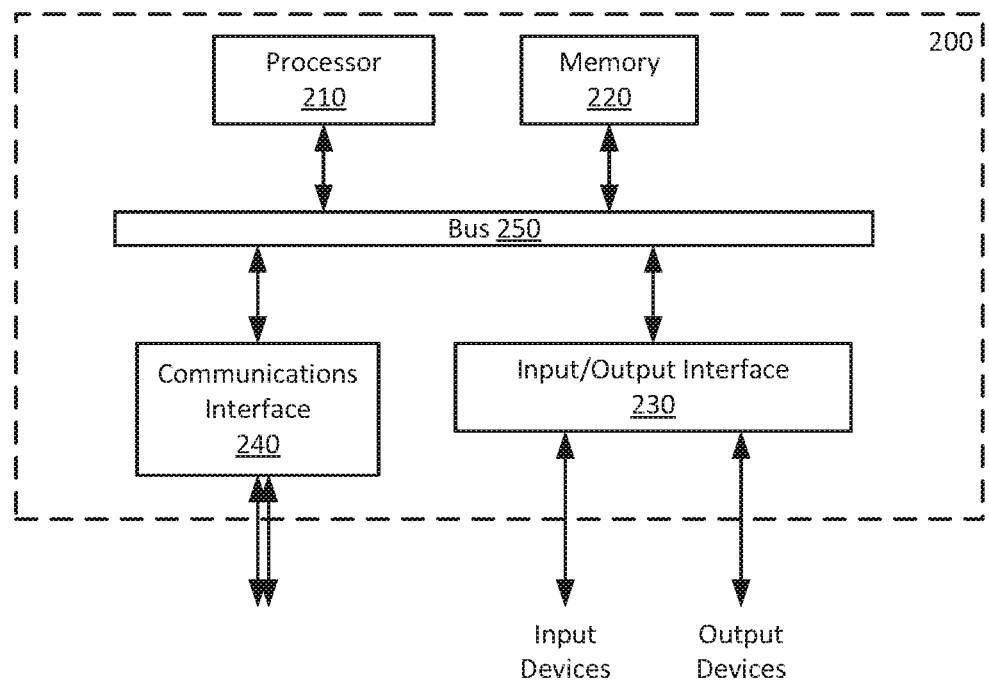
FIG. 2 is a representation of an example of a computing device.

FIG. 2 illustrates an example of a computing device 200 (e.g., computing device 110) that includes a processor 210, a memory 220, an input/output interface 230, and a communication interface 240. A bus 250 provides a communication path between two or more of the components of computing device 200. The components shown are provided by way of illustration and are not limiting. Computing device 200 may have additional or fewer components, or multiple of the same component.

Processor 210 represents a programmable processor, which may be, for example, a general-purpose processor, digital signal processor, microprocessor, microcontroller, application specific integrated circuit (ASIC), field programmable gate array (FPGA), other circuitry effecting processor functionality, or multiple ones or combinations of the foregoing, along with associated logic and interface circuitry. Processor 210 may be incorporated in a system on a chip.

Computing device 200 may include code that creates an execution environment for a computer program, such as code that constitutes processor firmware, a protocol stack, a database management system, an operating system, a cross-platform runtime environment, a virtual machine, or a combination of one or more of the foregoing.

A computer program (also known as a program, software, software application, script, instructions or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a network, such as network 120 or 125.

Memory 220 represents one or both of volatile and non-volatile memory for storing information (e.g., instructions and data). Examples of memory include semiconductor memory devices such as EPROM, EEPROM, flash memory, RAM, or ROM devices, magnetic media such as internal hard disks or removable disks or magnetic tape, magneto-optical disks, CD-ROM and DVD-ROM disks, holographic disks, and the like.

Portions of behavior and abnormality detection system 100 may be implemented as computer-readable instructions in memory 220 of computing device 200, executed by processor 210.

An embodiment of the disclosure relates to a non-transitory computer-readable storage medium (e.g., memory 220) having computer code thereon for performing various computer-implemented operations. The term "computer-readable storage medium" is used herein to include any medium that is capable of storing or encoding a sequence of instructions or computer codes for performing the operations, methodologies, and techniques described herein. The media and computer code may be those specially designed and constructed for the purposes of the embodiments of the disclosure, or they may be of the kind well known and available to those having skill in the computer software arts.

Examples of computer code include machine code, such as produced by a compiler, and files containing higher-level code that are executed by a computer using an interpreter or a compiler. For example, an embodiment of the disclosure may be implemented using Java, C++, or other object-oriented programming language and development tools. Additional examples of computer code include encrypted code and compressed code. Moreover, an embodiment of the disclosure may be downloaded as a computer program product, which may be transferred from a remote computer (e.g., a server computer) to a requesting computer (e.g., a client computer or a different server computer) via a transmission channel. Another embodiment of the disclosure may be implemented in hardwired circuitry in place of, or in combination with, machine-executable software instructions.

Input/output interface 230 represents electrical components and optional code that together provide an interface from the internal components of computing device 200 to external components. Examples include a driver integrated circuit with associated programming, or an interface to storage 150.

Communication interface 240 represents electrical components and optional code that together provides an interface from the internal components of computing device 200 to external networks, such as network 150. Communication interface 240 may be bi-directional, such that, for example, data may be sent from computing device 200, and instructions and updates may be received by computing device 200.

Bus 250 represents one or more interfaces between components within computing device 200. For example, bus 250 may include a dedicated connection between processor 210 and memory 220 as well as a shared connection between processor 210 and multiple other components of computing device 200.

Figure 3:
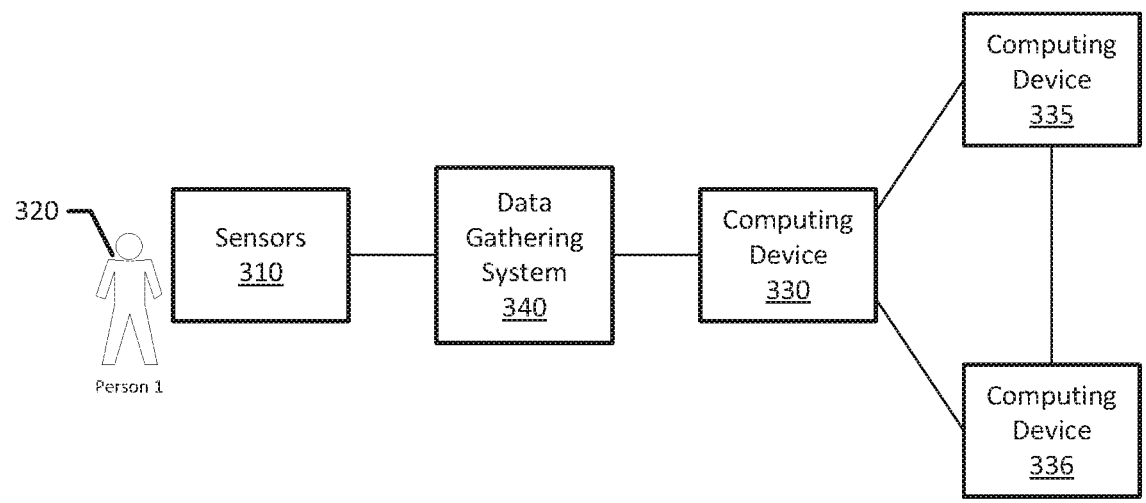
FIG. 3 is a representation of an example of a remote health monitoring system.

FIG. 3 is a representation of an example of a remote health monitoring system (RHMS) 300 useful for implementing the behavior and abnormality detection techniques of the present disclosure. RHMS 300 allows for collecting physiological and contextual information from individuals (e.g., patients) and predicting physiological conditions of the individuals. For example, medical conditions associated with chronic disease may be predicted. RHMS 300 provides a platform for data collection using body area sensors or sensor networks, information integration, data analysis, medical event prediction, and personalized education.

RHMS 300 includes one or more sensors 310 that monitor an individual 320 and provide information to a computing device 330 (e.g., computing device 110). In one or more embodiments, sensors 310 provide information to computing device 330 wirelessly; in other embodiments, one or more of sensors 310 may provide information by way of a wired connection, either to another sensor 310 or to computing device 330. Sensors 310 collect information from individual 320, such as vital signs, physiological data, motion, recognized physical activities, and other information. In one or more embodiments, RHMS 300 further includes an optional data gathering system 340, which gathers information from one or more of sensors 310 and provides information related to the gathered information to computing device 330 through a wired or wireless interface. Data gathering system 340 may be capable of coupling to a variety of sensors 310 through a variety of physical interfaces or protocols. Data gathering system 340 may be coupled to wearable or implantable sensors 340.

In one or more embodiments, data gathering system 340 is included within computing device 330.

A user interface of computing device 330 allows collection of information from individual 320 (e.g., responses to questions) and provision of information (e.g., notifications or histories) to individual 320.

Computing device 330 provides information from sensors 310, and information received through the user interface, to a computing device 335 (e.g., a computing device 110). In one or more embodiments, computing device 335 is a cloud based data storage and search system. The information may be provided to computing device 335 by way of one or more networks (e.g., network 120 or 125), or may be provided directly to computing device 335 by way of a wired or wireless connection.

A computing device 336 accesses information from computing device 335 through a network or by way of a wired or wireless connection. In one or more embodiments, computing devices 335 and 336 are co-located. In one or more embodiments, computing devices 335 and 336 are implemented in a same device.

Computing device 336 includes an analytics engine based on machine learning techniques. The analytics engine is used, for example, for diagnostics and prognostics. The analytics engine includes a number of advanced methodologies for data preprocessing (e.g., data cleaning, feature extraction, feature selection), model generation (training a prediction model, interfacing with a training database), applying the prediction model to incoming data to predict medical events and conditions, and presenting visualizations of information, such as to clinicians. In addition to predicting adverse events such as hospital readmissions, death, emergency visits, and other medical complications, the analytics engine can predict symptoms that are associated with worsening of various medical conditions.

The data analytics engine may use anomaly detection methodologies to identify abnormalities in collected data. The analytics engine can extract trends in an individual's collected physiological data, and build a model related to patterns exhibited by the individual. Abnormalities may be determined by events or observations that deviate from an expected pattern for the individual. For example, a series of physiological observations (e.g., vital sign measurements) that are collected from body sensors during a period of time may be analyzed to determine a trend, and if the trend does not conform to a historical trend for the individual, an abnormality may be detected. Such an abnormality may indicate a worsening or improving condition of the individual. Additionally or alternatively, an abnormal trend can be used to predict adverse events and medical complications.

Figure 4:
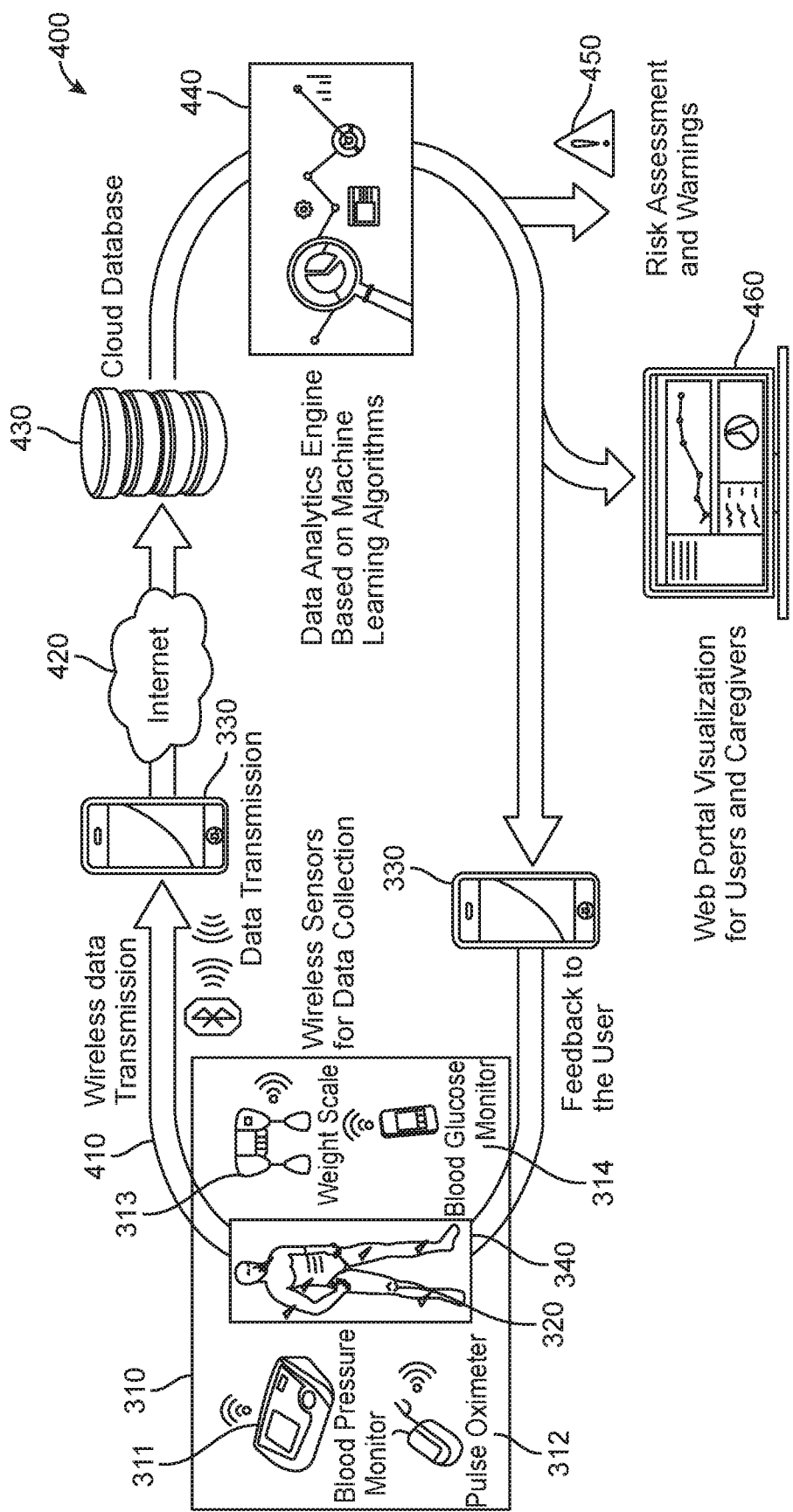
FIG. 4 is a representation of an example of a remote health monitoring system.

FIG. 4 illustrates a system 400 that is an example of system 300. System 400 includes a set of one or more sensors 310 positioned to monitor an individual 320, where sensors 310 may be wearable by the individual 320, implantable in the individual 320, or external to the individual 320. Sensors 310 in this example include blood pressure monitor 311, pulse oximeter 312, weight scale 313, and blood glucose monitor 314. An optional data gathering system 340 gathers information from sensors 310, and provides information related to the gathered information to computing device 330 by way of a Bluetooth protocol interface. Alternatively or additionally, one or more sensors 310 provide information directly to computing device 330 by way of a Bluetooth protocol interface 410. The interface 410 is illustrated as Bluetooth by way of example, and another protocol may be implemented instead (or additionally). Although illustrated in FIG. 4 as wireless, the interface 410 may be wired.

Computing device 330 is illustrated in FIG. 4 as a smart phone; however, computing device 330 may be in another form (e.g., as described with respect to computing device 110). Computing device 330 provides information via a network 420 (illustrated as the Internet, but may be another network, e.g., network 120 or 125) to a database 430 (e.g., storage 150) associated with computing device 335, not shown in FIG. 4. Information from database 430 is operated on by a data analytics engine 440 associated with computing device 336, not shown in FIG. 4. Data analytics engine 440 provides, for example, risk assessments and warnings 450 to computing device 330, which may be provided to the individual 320, or to a monitoring individual such as a caregiver. Data analytics engine 440 can generate an alert that activates or triggers activation of the user interface of computing device 330 to cause visualization of a medical event or condition to display on computing device 330 of the individual 320, computing device 330 of the caregiver, or both. Data analytics engine 440 also provides information to computing device 330, and to visualization tools 460 (e.g., at a user interface of a computing device 110) for viewing, arranging, and searching the information. Computing device 330 may provide information to the individual 320 through a user interface.

Described in the present disclosure is a technique for constructing behavior models of human motion based on contextual and semantic properties in human physiological behavior. The approach transforms multidimensional time series data recorded from wearable or implantable sensors (e.g., sensors 310) into combinatorial space, leverages a modeling and clustering technique to build behavior models, and uses the behavior models for fast real time classification of human activities and abnormality detection. Static and dynamic properties of behavior are included in a single model. Activity templates are used for known activities or behavior. New activity or behavior is compared against known activities/behaviors with a linear time comparison. Commercial applications include, among others, recognizing behavior and activity, recognizing unknown behavior and abnormality, recognizing context, and decision making about the state of a human and the actions of the human. The technique allows for mobile activity recognition systems, a mobile real time classifier, and fast and real time activity or behavior matching. The technique may be used in a mobile application due to its compactness and low computational complexity, for example.

Recognizing activities and actions based on wearable sensor data has important implications for health monitoring applications such as gait analysis, rehabilitation, quantitative measurement of motion functions, elder care, and obesity, among a great many other applications. The effectiveness of the technique on recognizing human ambulation using an insole instrumented with pressure sensors placed inside each shoe is provided by way of example in the present disclosure.

Figure 5:
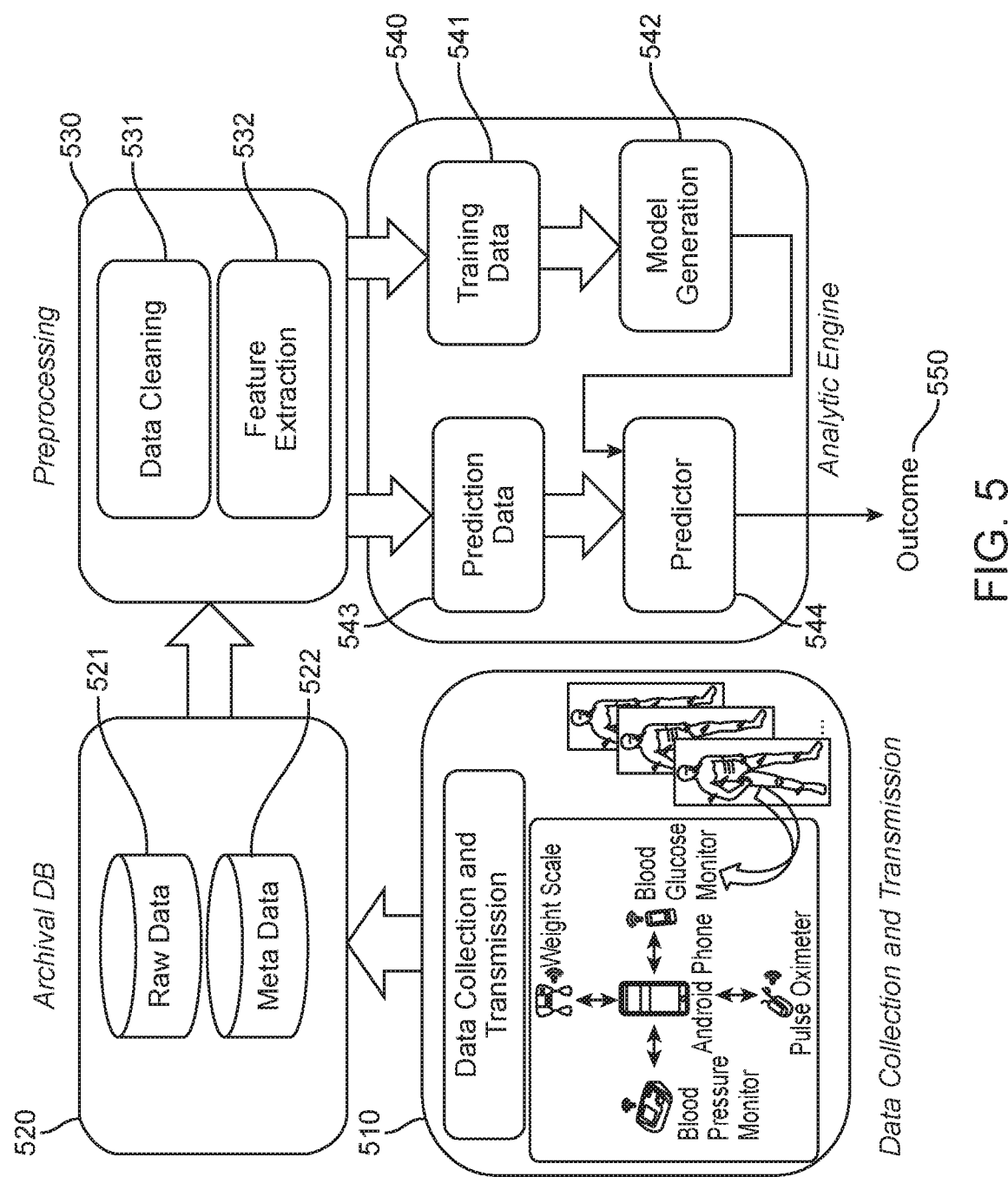
FIG. 5 illustrates an example of construction and use of a behavior model of human motion.

FIG. 5 illustrates an example of construction and use of a behavior model of human motion. A data collection and transmission block 510 illustrates that data is collected from sensors (e.g., sensors 310) that monitor one or more individuals, and the data, or information regarding the collected data, is provided to a computing device (e.g., computing device 110, illustrated in FIG. 5 as a smartphone). The computing device provides the information to a database 520 (e.g., cloud database 430), and information is stored in database 520 as raw data 521 and meta data 522 describing the raw data 521. Information in database 520 is preprocessed, as indicated by preprocessing block 530. Preprocessing includes data cleaning 531 and feature extraction 532, which is described in more detail below. An analytic engine 540 (e.g., data analytics engine 440) analyzes the data. When generating a model, analytic engine 540 uses pre-processed data and features as training data 541 for generating the model, in model generation block 542, which identifies predictors 544 from the training data 541. When using the model subsequently to make predictions, analytic engine 540 uses pre-processed data and features as prediction data 543, which is compared to the predictors 544 to predict an outcome 550 given the prediction data 543. The training data 541 may be data from one individual or multiple individuals. The prediction data 543 is data regarding one individual. Thus, an outcome 550 may be predicted given information from the one individual, based on historical information from one or more individuals.

Figure 6:
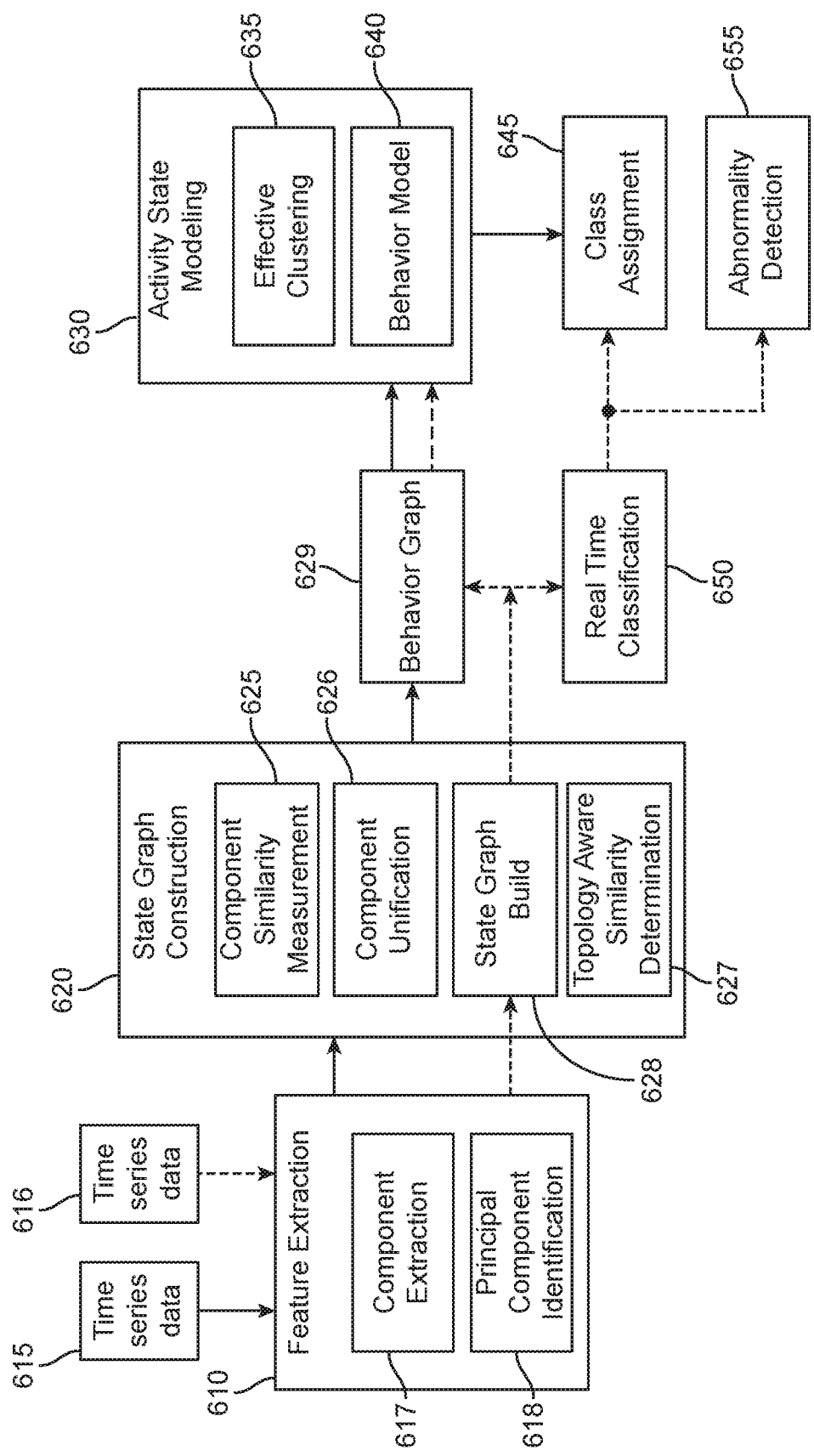
FIG. 6 illustrates an example of construction and use of a behavior model of human motion.

FIG. 6 illustrates an example of construction and use of a behavior model of human motion, by way of a feature extraction block 610, a state graph construction block 620, and an activity state modeling block 630, among others. Solid lines in FIG. 6 indicate construction of the behavior model in a model-building stage; dotted lines indicate use of the behavior model in an investigative stage, and dash-dot lines indicate refinement of the behavior model after it is initially constructed.

Feature Extraction Block 610: Recorded multi-dimensional time series signals are segmented, and features imposed by human physiological behavior are extracted from each segment. Feature extraction block 610 receives time series data 615 during a model-building stage. The time series data 615 may be historical data regarding an individual, or may be historical data regarding a group of individuals. Feature extraction block 610 receives time series data 616 during an investigative stage, after the model is built. In both the model-building stage and the investigative stage, features are extracted as time segments from the time series data 615 or 616, and the extracted features are divided into sub-segments, called components (component extraction block 617). Principal components may optionally be identified (principal component identification block 618) from the components.

State Graph Construction block 620: A state graph is a combinatorial representation of components extracted from the time series data. The vertices of the state graph are components, and similar components are connected by weighted edges. The weight associated with each edge is a similarity value of two connecting vertices (components).

To construct a state graph in the model-building stage, components identified at component extraction block 617 (or, alternatively, principal components identified at principal component identification block 618) are compared to determine similarity between them and grouped based on similarity (component similarity measurement block 625). A unification technique is used to identify and present identical or similar components, while eliminating the role of interferences from noise and environmental bias in the recorded data (component unification block 626). The technique includes signal normalization, signal segmentation, and component representation.

State graphs are constructed from the groups of components (state graph build block 627), and similarity of state graph topology between the state graphs is identified (topology aware similarity determination block 628). A behavior graph 629 is then constructed from the state graphs. Each vertex in the behavior graph 629 is a state graph and edges connect similar vertices (state graphs). Behavior graph 629 is a representation of the entire recorded multi-dimensional time series data in combinatorial space.

Activity State Modeling Block 630: Behavior graph 629 is clustered using a clustering technique (effective clustering block 635). Each cluster contains a set of topologically similar state graphs, which represent similar activities. A representative state graph is chosen from each cluster, and the selected state graphs collectively form a behavior model 640. A form of representation for the behavior model 640 is by way of a group 645 of classes including a number of classes 1 . . . n. Behavior model 640 can be used for online classification of new occurring activities in the investigative stage, as follows.

In the investigative stage, components of time series data under investigation, that were identified at component extraction block 617 (or, alternatively, principal components identified at principal component identification block 618), are used to construct a state graph representing the time series data under investigation (state graph build block 627). The state graph is compared with behavior graph 629 constructed in the model-building stage, to identify, if existing, a corresponding vertex in behavior graph 629 that corresponds to the state graph representing the time series data under investigation. If a vertex of behavior graph 629 is identified as corresponding to the state graph representing the time series data under investigation, a classification of the time series data under investigation is made (real time classification block 650), where the classification is a known representation of a motion (classes 1 . . . n in class group 645), a variance from a known representation of a motion, or an unknown motion. In one or more embodiments, if the state graph representing the time series data under investigation varies by a predefined amount from the identified vertex of behavior graph 629, the motion is classified by real time classification block 650 as an abnormality 655. If no vertex of behavior graph 629 is identified as corresponding to the state graph representing the time series data under investigation, the time series data may be discarded, or may be classified as an abnormality 655. It is important to note that the term 'abnormality' in this context indicates that the activity was not seen before.

Behavior model 640 may be refined by updating behavior graph 629 with state graphs constructed during the investigative stage, and updating behavior model 640 with updated behavior graph 629. In this way, behavior model 640 may have an increased accuracy with increased investigation.

The behavior model may become polluted over time, and therefore the behavior model may be rebuilt as necessary.

Referring to FIGS. 3 and 6, time series data 615 and/or time series data 615 may be information received from sensors 310 and provided to computing device 335 by computing device 330. Time series data 615 may alternatively be information from a database (e.g., in storage 150 in FIG. 1, or database 430 in FIG. 4) or other storage. In one or more embodiments, time series data 615 is information accessed from a database of data compiled from multiple sources. Time series data 615 and 616 may be stored in a memory prior to analysis (e.g., storage 150 in FIG. 1 or memory 220 in FIG. 2).

Feature extraction block 610, state graph construction block 620, activity state modeling block 630, behavior graph 629 and class group 645 are implemented as computer-executable instructions in a computing device (e.g., computing device 330, 335 or 336 of FIG. 3). In one or more embodiments, implementation is in a first computing device in the model-building stage, and in a second computing device in the investigative stage. By way of non-limiting example, in the model-building stage, a high-performance backend computing device may be used to analyze vast quantities of data to construct the behavior model 640 (offline); whereas in the investigative stage, a hand-held computing device containing the behavior model 640 may be used to analyze much smaller quantities of data gathered from a body sensor network (online).

Having described the construction and use of a behavior model, examples are provided next of a prototype shoe-based system and a personal activity monitor system, each including a sensor network and an analytics engine. It should be understood that other systems will also benefit from the analytics described in the present disclosure.

System Study 1

Data extracted from human motion using wearable sensing devices have properties, which are imposed by human gait characteristics. For example, the morphology of time series waveforms recorded from each sensing channel is not random, has natural phases, and is bounded by human physiological characteristics. Plantar pressure properties corresponding to human ambulation were studied in the shoe-based sensing system study 1 to identify physiological and behavioral trends. Three characteristics used in this study were natural phase, maximum applied pressure, and progression of applied pressure.

Natural Phase: The recorded time series signal corresponding to each plantar pressure point has four natural states, which are referred to as airborne, grounded, takeoff and landing. The airborne state corresponds to a time interval when there is no pressure applied on the sensing point. The grounded state corresponds to a time interval when there is constant pressure applied to the sensing point. The landing state corresponds to a time interval from when the signal begins increasing in amplitude from the base offset value until just before the signal begins decreasing in value. The take-off state corresponds to a time interval during which the signal amplitude decreases from its peak to the base offset value.

Maximum Applied Pressure: The commutative sum of values recorded from active pressure points at each step are almost constant, with some error which is bounded by error produced by the pressure sensors. This constancy is due to the fact that human weight does not change perceptibly between steps.

Progression of Applied Pressure: The excitation of pressure values among plantar pressure sensors propagates across the foot between the time the foot hits the ground until the time the foot leaves the ground. The direction and form of the propagation depends on the type of ambulation.

Figure 7:
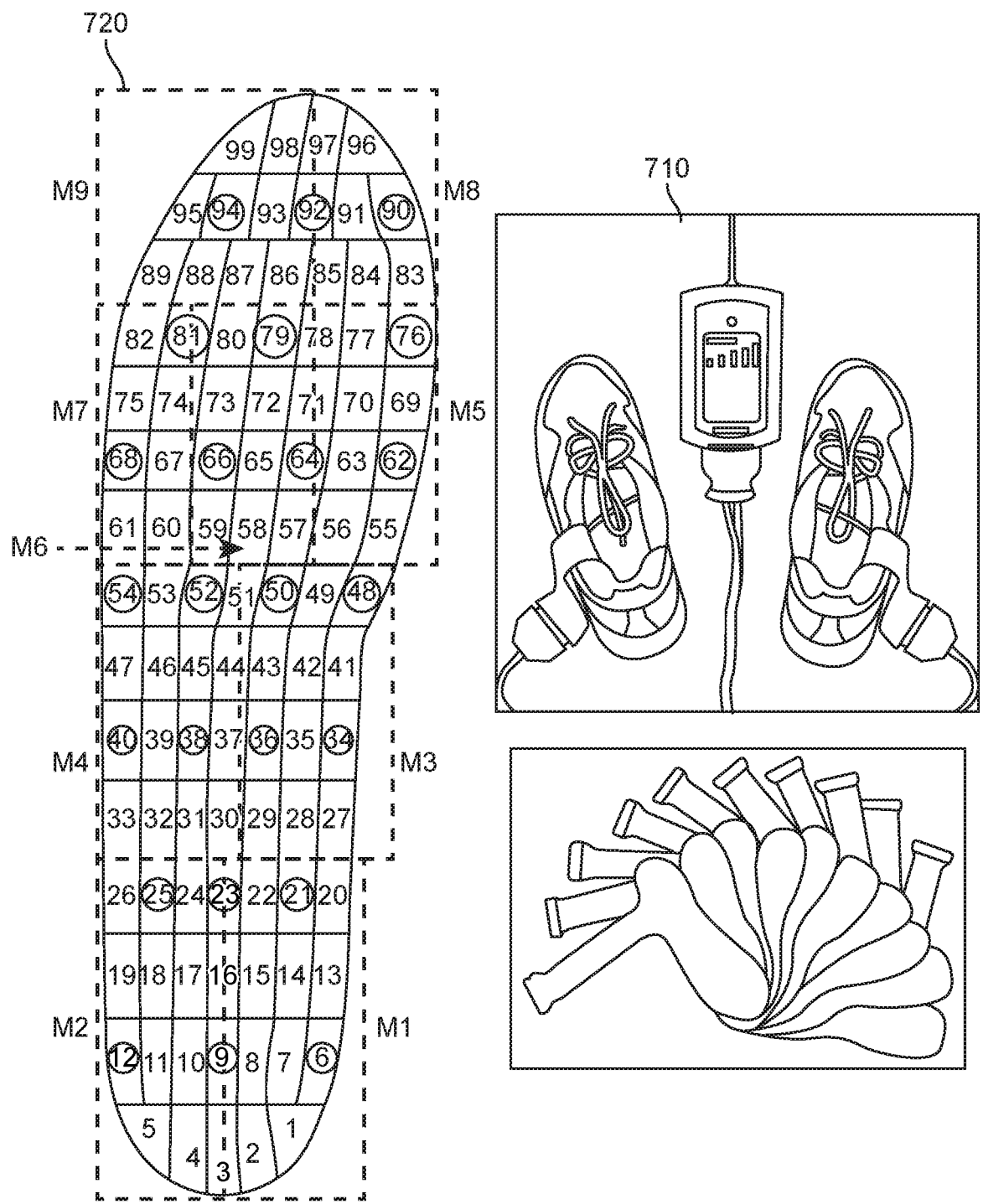
FIG. 7 illustrates an example of a shoe-based system for construction and use of a behavior model of human motion.
Figure 8:
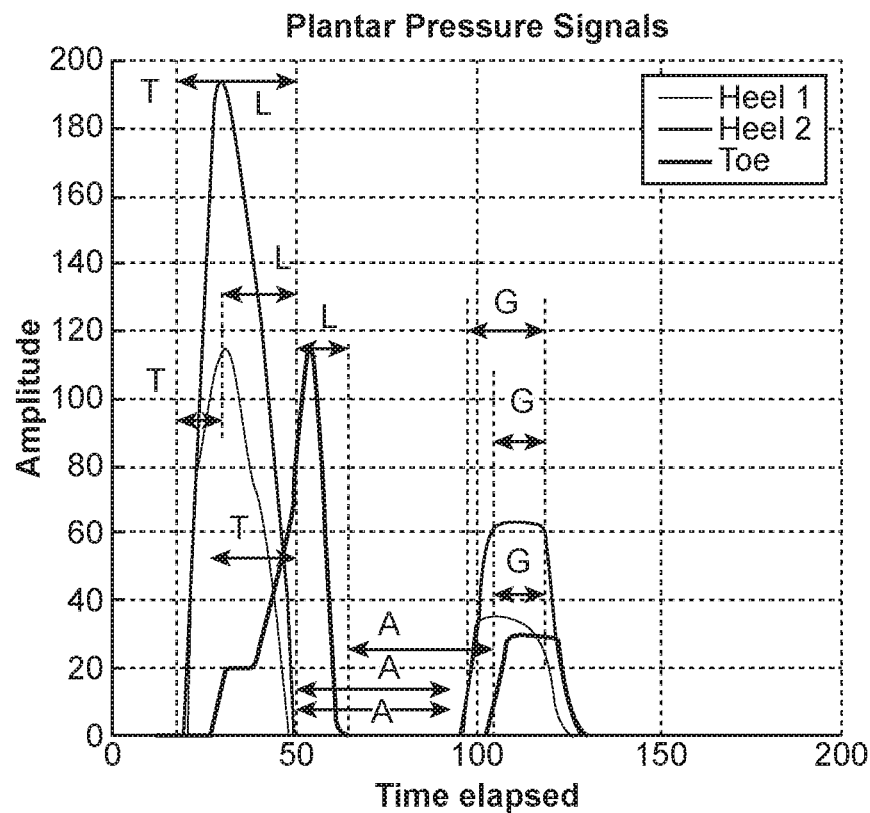
FIG. 8 shows segmented states for data recorded from three pressure sensors in the system of FIG. 7.
Figure 9:
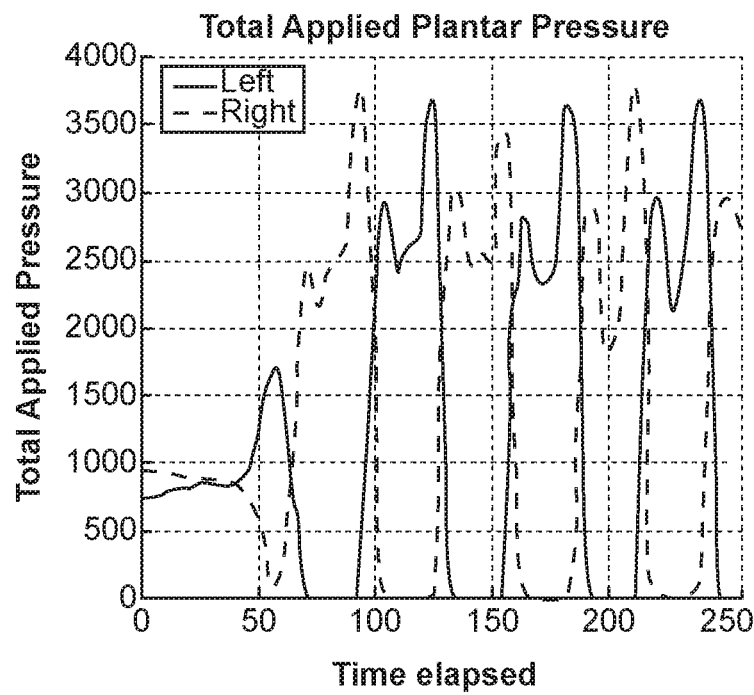
FIG. 9 shows a sum of values recorded from active pressure points under both feet in the system of FIG. 7.
Figure 10:
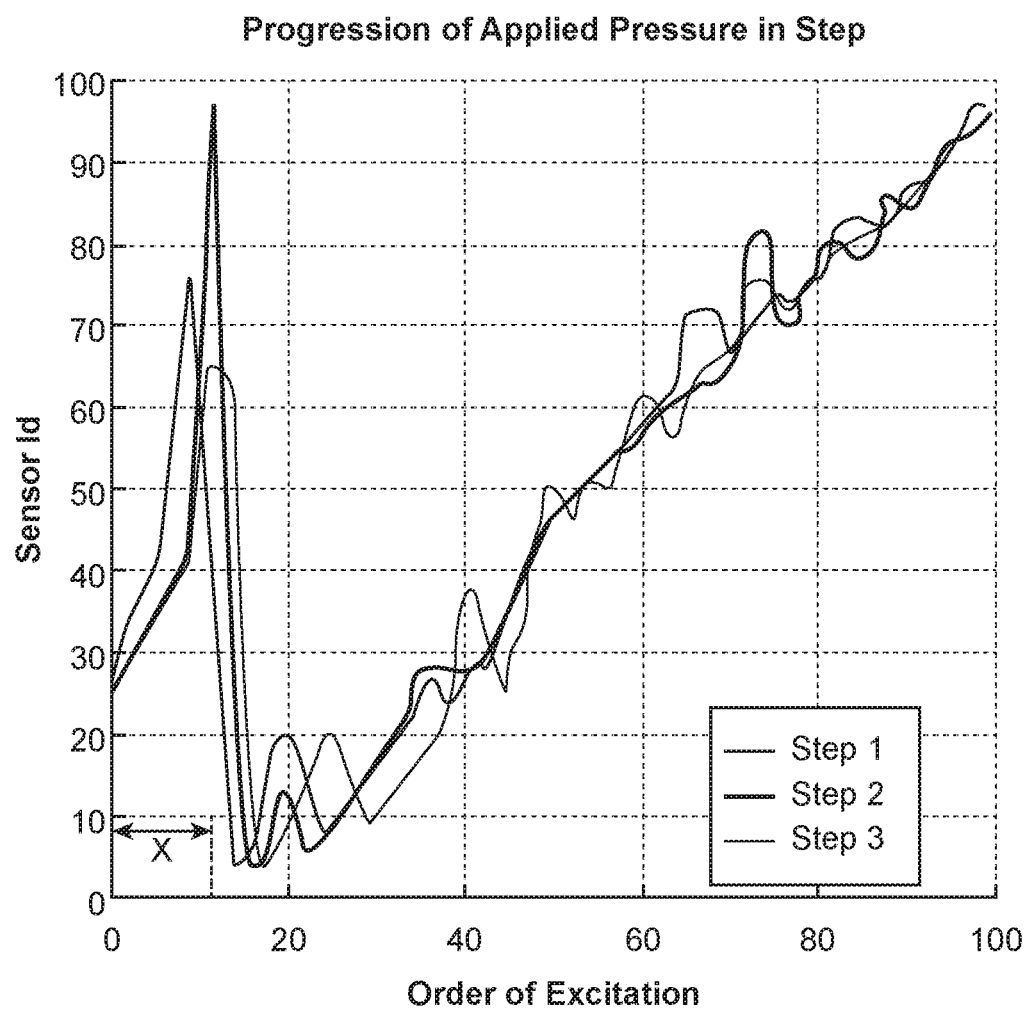
FIG. 10 shows an order where pressure points are exited for three different steps in the system of FIG. 7.

In this study, a Pedar was used as a sensing platform. The Pedar is an insole instrumented with 99 pressure sensors. FIG. 7 shows a Pedar system 710 and the pressure mapping 720 of the 99 pressure sensors in the Pear insole. The circles indicate the sensors for which sensor information was considered in the shoe-based sensing system study. FIGS. 8-10 present plots of natural phase, maximum applied pressure, and progression of applied pressure, respectively, as determined from measurements taken during ambulation.

FIG. 8 shows four segmented states for data recorded from three pressure sensors (two sensors from the heel and one from the front of the foot). FIG. 9 shows the sum of the values recorded from active pressure points under both feet, and suggests that the total amount of the applied pressure under both feet is nearly constant for every step and nearly constant for each stationary period. FIG. 10 shows the order where pressure points are exited for three different steps, and suggests that the order of excitation, which corresponds to the transition of human weight, follows an almost constant path. The intrinsic properties of the recorded time series plantar pressure signals are used for clustering and classifying of similar human activities and for detecting abnormalities.

As described with respect to FIG. 6, a behavior model was constructed in a model-building stage, then the model was used in an investigative stage. The model was constructed offline using historical recorded multi-dimensional time series signals. The model was then used online in the investigative stage for real-time classification.

The signal stream from individual sensors is considered to capture the status of the environment under study. A goal is to create a comprehensive yet computationally efficient unit of information that can represent the sensor readings in any time interval. The system encompasses a set of sensors $S=\{s_1, \ldots, s_n\}$. The data collected from each sensor is denoted as $d_s(t)$, where s is the sensor and t is the time. In practice, since values corresponding to each sensor are measured through discrete sampling, $d_s(t)$ is a discrete-time function. An objective is to find a set of components, $C=\{c_1, \ldots c_m\}$, where each component $c_i$ is a finite segment of data with an associated interval and set of functions. Each function represents a property of the signal in the time interval associated with the component. A unification technique identifies identical or similar components, while eliminating the role of interferences from noise and environmental bias in the recorded data. The technique includes signal normalization, signal segmentation, and component representation.

Signal normalization removes direct current (DC) signals and low frequency alternating current (AC) bias.

Signal segmentation defines components that can potentially represent the significant building blocks or the underlying behavior in the data. In order to limit the number of possibilities, the behavioral properties imposed by human physiology during locomotion are used to define segmentation rules to extract components, such that each component is limited in length. The start and end of a segment is determined by the boundaries of the natural phases discussed above. Each of the segmented sections is considered as a potential component, which may be used to map the time series signal to combinatorial space.

Component representation represents each extracted component by its interval and a set of functions that will return a value of interest from the corresponding interval.

The similarity of two components is defined as how closely they represent the same physiological phenomenon. In the context of the shoe based sensing system, similarity measures how closely segments represent the same morphology of the natural phases. Two different approaches are used to calculate the similarity.

For the components in the takeoff and landing states, a vector is constructed representing the state: for the takeoff state, the vector is constructed by connecting the beginning of the state to the maximum pressure value; and for the landing state, the vector is constructed by connecting the maximum pressure value to the last sample at the end of the state. For the components in the grounded stage, a representative vector is the diagonal of a rectangle constructed using the grounded stage and base line, where the diagonal is used as the vector to capture both amplitude of the pressure (how much weight is applied on the sensing point) and its duration (how long the weight is applied). The cosine similarity as shown in equation 1 is used to compute the similarity among two components in the same state, where $V_C$ is a vector representing component C, and S is the similarity of two components.

$$S(C_i, C_j) = \frac{\vec{V_{C_i}} \cdot \vec{V_{C_j}}}{\|\vec{V_{C_i}}\| \|\vec{V_{C_j}}\|} \quad (1)$$

Figure 11:
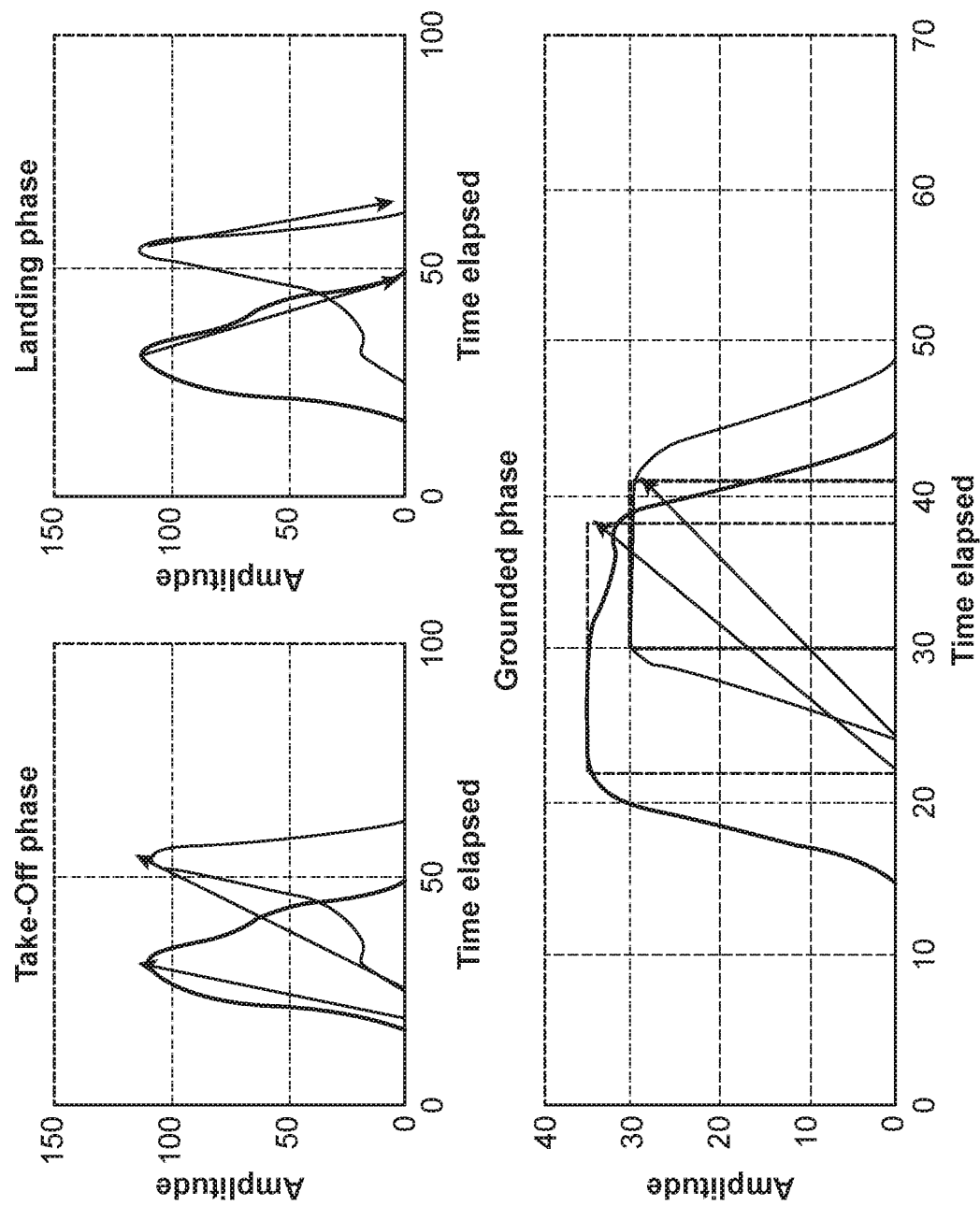
FIG. 11 illustrates examples of vectors in the various states.

FIG. 11 illustrates examples of vectors in the various states (phases).

For the components in the airborne stage, similarity is computed by considering the time duration of the stage. The airborne stage indicates that the pressure is offloaded from a particular sensor. This condition can happen either as direct result of short offloading, for example during a swing phase of human locomotion, or long offloading, when the feet are off the ground for long period of time, or when the user is sitting or standing on a single foot. In human gait characteristics, there is a normal time relationship of approximately 60% stance phase and 40% swing phase that each limb cycle goes through with each step.

The similarity of two components $C_i$ and $C_j$ is determined by comparing time duration, $t_c$. Similarity will be $|t_{C1}-t_{C2}|$ if both are smaller or larger than 44% of average step time, or the difference of $1.4*t_{Ci}-t_{Cj}$, where $C_i$ is the larger time interval and $C_j$ is the smaller time interval.

Similar and identical components are merged, and outliers are eliminated, to identify principal components. For each of the stages, a component graph $G_C=(V_C, E_C)$ is created. In this graph, each node represents a potential component, and for every pair of nodes a weighted edge is assigned. The weight of each edge is the similarity measure of how close two components are. An edge connectivity based clustering methodology is used through a minimum spanning tree to group similar nodes into communities. Each community is a graph $G_{Mi}$ with the same properties as component graph $G_C$. At this point there are a set of components that are statistically significant, called the principal components. After the principal components are identified, they are marked in their associated state for each interval of interest. The interval of interest is an application-dependent concept. For the purpose of the shoe based sensing system study, intervals of interest were defined as being a first interval between the time a foot touched the ground until the foot left the ground, and a second interval during the time when a foot was completely off the ground.

Human activity was modeled based on the data sampled from plantar pressure sensors as a weighted directed acyclic graph $G_T=(V, E)$. $G_T$ is a state graph that captures the behavior of a human in the chosen time interval. Each vertex in the state graph, $v_i = \langle s_{vi}, c_{vi} \rangle$, represents a pair of a sensor and a component, where $s_{vi}$ is the sensor and $c_{vi}$ is the corresponding component. There exists a directed edge e from $v_i$ to $v_j$ in the state graph if $\tau(v_i)-\tau(v_j)<0$, where $\tau(c)$ encompasses the precedence of a component's appearance in the considered time interval. In addition, the weight of an edge $e_{v_i v_j}$ is defined as $\tau(v_j)-\tau(v_i)$.

Similarity of two state graphs $G_a=(V_a, E_a)$ and $G_b=(V_b, E_b)$ is defined as a function of the consistent edges across graphs if there is no contradicting edge. Two edges $e_{uv}^1 \in G_a$ and $e_{uv}^2 \in G_b$ are said to be consistent edges if they have the same direction; otherwise, they are said to be contradicting. To systematically define the similarity measure, the edge sets in equations 2 and 3 are defined.

$$S_{a,b}=S(G_a,G_b)=\{e_{ij} | e_{ij} \in G_a, e_{ij} \in G_b\} \qquad (2)$$

$$R_{a,b}=R(G_a,G_b)=\{e_{ij} | e_{ij} \in G_a, e_{ji} \in G_b\} \qquad (3)$$

$S_{a,b}$ and $R_{a,b}$ represent the consistent and contradicting edge sets, respectively. If the contradicting edge set is not empty then two graphs are considered to be not similar. Otherwise the distance of two state graphs is computed as in equation 4, where $E_a$ and $E_b$ are sets of edges and $W_e^a$ and $W_e^b$ are the weight associated with each of the corresponding edges in graphs $G_a$ and $G_b$, respectively.

$$\phi(G_a, G_b) = \frac{1}{|E_a \cup E_b|} \sum_{e \in E_a \cup E_b} \frac{1-|\Delta W_e^{ab}|}{(|w_e^a|+|w_e^b|)/2} \qquad (4)$$

As equation 4 suggests, state graphs that have higher number of consistent edges will have closer distance, and therefore higher similarity.

Figure 12:
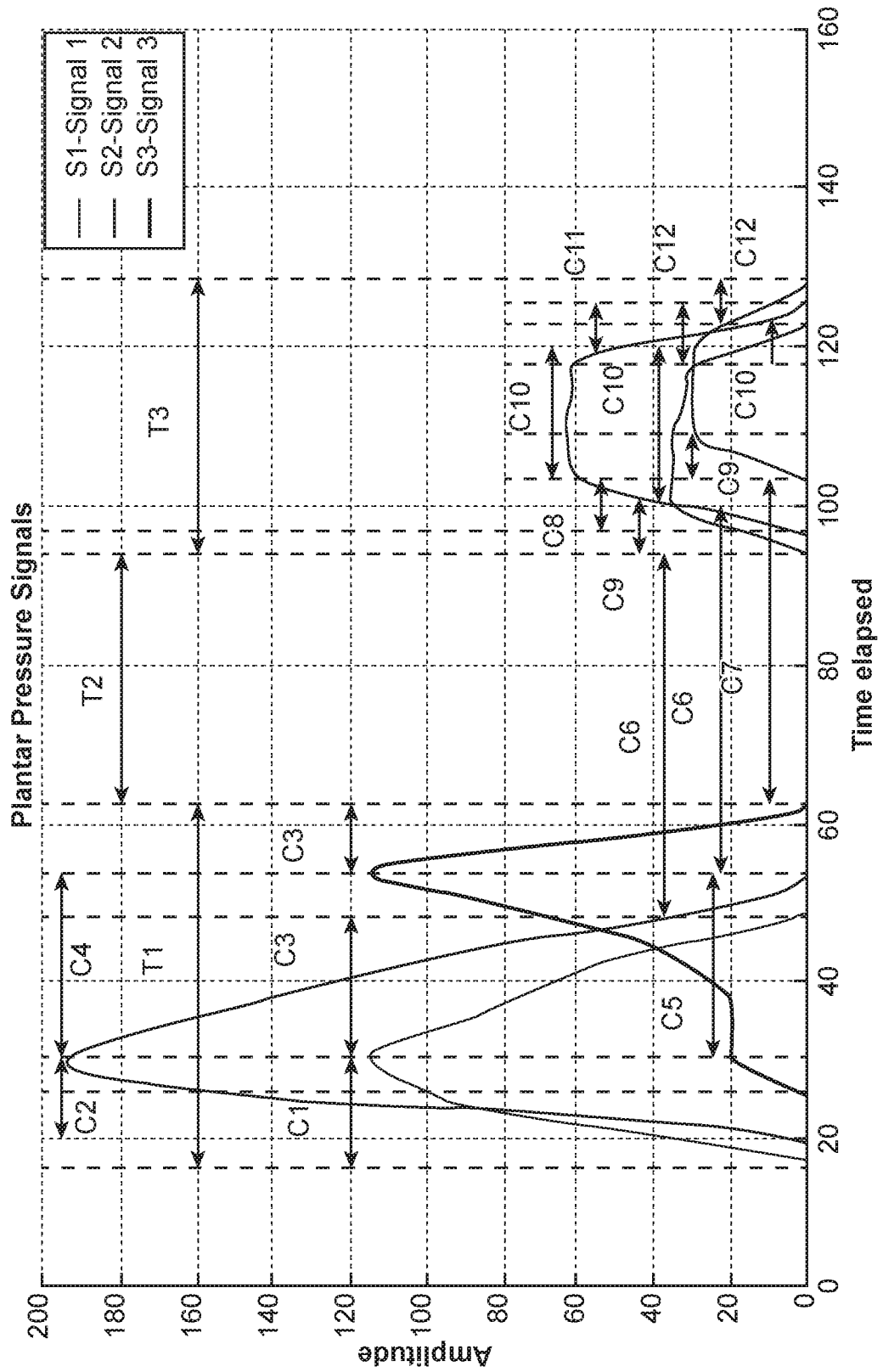
FIG. 12 plots three pressure signals, where components corresponding to the segments of the signals are identified.

FIG. 12 plots three pressure signals, where components corresponding to the segments of the signals are identified.

Figure 13:
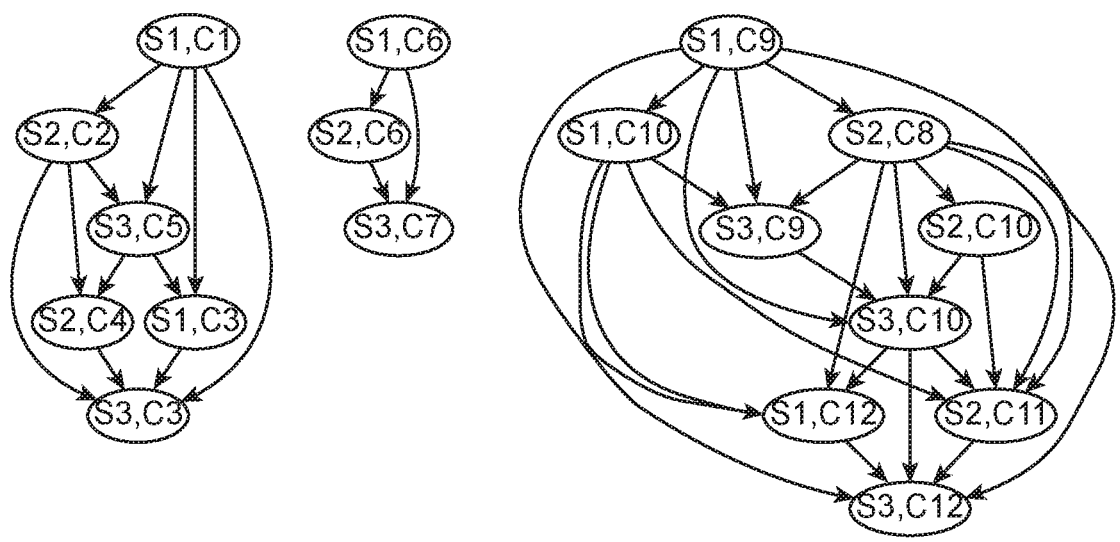
FIG. 13 shows state graphs associated with time segments shown in FIG. 12.

FIG. 13 shows state graphs associated with time segments shown in FIG. 12.

A unique activity or behavior in the sensing subsystem corresponds to a highly topologically similar class of state graphs. However, not all topologically similar state graphs represent the same behavior or activity. Two properties are defined for each state graph, dynamic and static properties. A dynamic property is captured by a state graph's topology, which identifies the mutual precedence of the features across sensors. A static property is a quantifiable measure assigned to each state graph. Two static measures were used in the shoe based sensing system study: the duration that the state graph represents (length of the longest path in the graph); and the maximum peak pressure values of the components inside the state graph. By considering static properties, time and amplitude dependence of underlying behavior of each state graph are separated from topology. The static properties of the state graph can be used to differentiate some topologically similar activities, as will be discussed below.

A goal of the shoe based sensing system study was to group similar state graphs that are representative of a particular human physiological behavior. The constructed state graphs for each of the time intervals in the collected data were used to create a behavior graph. The behavior graph represents all of the states that the underlying sensing system has observed. The behavior graph is defined as $G_b=(V_b, E_b)$, where each vertex $v_i s$ is a state graph, edges $e_{ij} \square E_b \Leftrightarrow \varphi(v_i, v_j)$ represent state similarities, and the weight of each edge is the similarity value $w_{ij}=w(e_{ij}=\varphi(v_i, v_j))$ as computed in equation 4. The behavioral graph is used for grouping (or clustering) similar activities, and for creating activity sets (behavior model) for future matching, and for identifying abnormalities.

Figure 14:
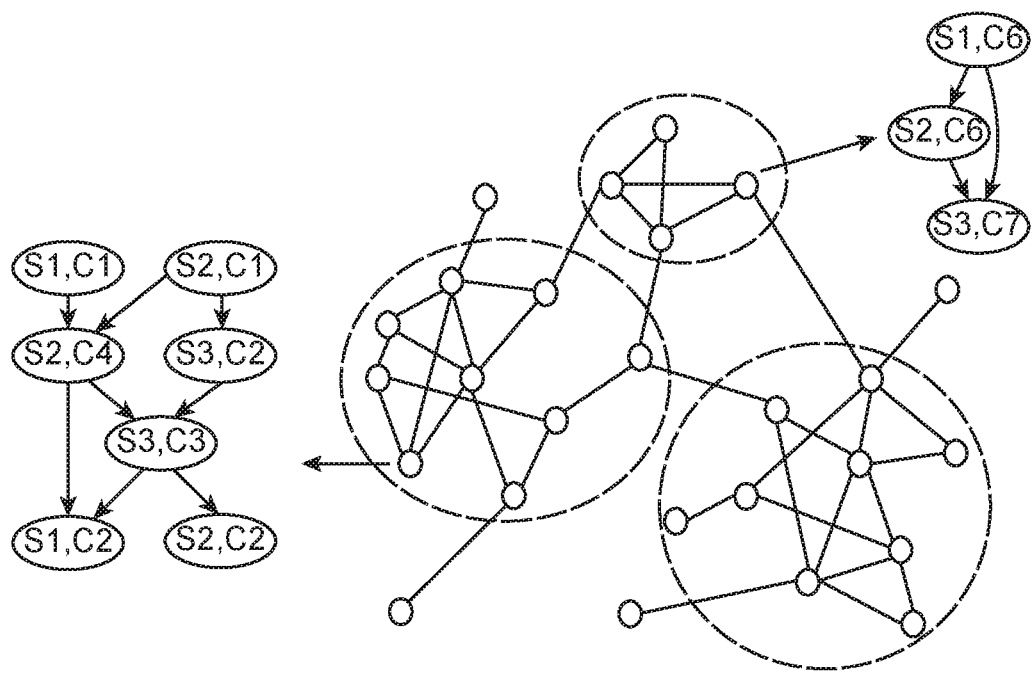
FIG. 14 illustrates a clustered behavior graph, where nodes are state graphs, and the weight of edges connecting two state graphs is their similarity.

FIG. 14 illustrates a clustered behavior graph, where nodes are state graphs, and the weight of edges connecting two state graphs is their similarity. After clustering, each cluster will have topologically similar state graphs.

To cluster similar activities, a community finding approach was used, which takes advantage of an effective measure for grouping called modularity. Modularity is defined as the fraction of edges that fall within communities, minus the expected value of the same quantity of edges if they fall at random without regard to the community structure. In general, modularity measures the meaningfulness of a particular division of the network. Assume that $A_{ij}$ is the adjacency matrix representing nodes in i and j, $k_i$ and $k_j$ are degrees of vertices, m is total number of edges in the network, and $\sigma(i, j)$ is a function, which has a value of 1 if i=j, and zero otherwise. Under these assumptions, modularity is defined as in equation 5.

$$Q = \sum_{\forall ij} \left[ A_{ij} - \frac{k_i k_j}{2m} \right] \sigma(c_i, c_j) \qquad (5)$$

For a division in which the communities include no edges, one would expect by random chance the result of Q would be zero. Values other than zero are an indication of deviation from randomness, and values greater than 0.3 are an indicator of significant community structure. Since a high value of Q indicates existence of good community division, the problem of clustering the graph becomes a problem of maximizing Q over all possible divisions. For the shoe based sensing system study, a version of this technique was used, which runs in time $O(n^2)$ on sparse graphs with reasonable practical results. This technique is capable of computing modularity as it progresses, therefore it can find the optimal community structure. Since the graph is directed, just using the modularity function, which only considers edge betweenness, will not work because strong edges will have a disproportionate number of short paths, which might be the edges of interest. Therefore, the weights of the edges are used while formulating modularity for the behavior graph, as specified in equation 6.

$$Q^b = \frac{1}{|E_b|} \sum_{\forall ij} \left[ W_{ij} - \frac{k_i k_j}{2|E_b|^2} \right] \sigma(c_i, c_j) \qquad (6)$$

$W_{ij}$ is an adjacency matrix, where entries are weights of connection from i to j, and $E_b$ is the set of edges in the behavior graph. An objective of the clustering technique will be to maximize $Q^b$, the modularity over all possible divisions. Starting with a state in which each vertex is the sole member of one of n communities, communities are repeatedly joined together in pairs, choosing at each step the joining that results in the greatest increase (or smallest decrease) in $Q^b$. Since the joining of a pair of communities between which there are no edges at all can never result in an increase in $Q^b$, only those pairs between which there are edges are considered. The clustering is summarized in Methodology 1.

---
Methodology 1 - clustering the behavior graph
---
1:    Input: Behavior graph $G_b = (V_b, E_b)$
2:    Output: Clusters of State Graph $C_G^b = \{C_1, C_2, ..., C_n\}$
3:    $C_i \leftarrow v_i \forall v \in V_b$
4:    prev_modularity = 0
5:    W ← compute adjacency matrix for $C_G^b$
6:
7:    while true do
8:      for each $C_i$ and $C_j$ in $C_G^b$ do
9:        if $W_{ij}$ == 0 then
10:          contine
11:        end if
12:        if $C_i == C_j$ then
13:          Join_Map ← $[C_j, 1]$
14:        else
15:          Join_Map ← $[Join(C_i, C_j), Q(C_i, C_j)]$
16:        end if
17:      end for
18:
19:    $S_{Join\_Map}^Q$ ← sort $C_{ij}$ based on modularity.
20:    Clear $C_G^b$
21:    $Set_v \leftarrow V_b$
22:    curr_modularity = 0
23:
24:    for $C_k \in S_{Join\_Map}^Q$ do
25:      $C_{G_k}^b \leftarrow C_k$
26:      $Set_v \leftarrow C_{k_v}$
27:      curr_modularity ← curr_modularity + $Q_k$
28:      if $Set_v == V_b$ then
29:        break
30:      end if
31:    end for
32:
33:    If curr_modularity−prev_modularity <= 0 then
34:      Done
35:    else
36:      prev_modularity ← curr_modularity
37:    end if
38: end while
---

The clustering methodology groups state graphs with similar dynamic properties. However, as mentioned above, two state graphs with similar dynamic properties do not necessary mean that they are presenting the same type of activity. Therefore, nodes with similar static properties are grouped in each of the clusters. The static measure for each state graph is computed, then nodes grouped using a k-mean clustering methodology. The clusters generated by k-mean will contain state graphs with similar static properties. Since the data is in one dimension, an optimal k mean clustering methodology using dynamic programming is used to achieve better performance.

Once the clusters are identified, a representative vertex (state graph) is picked from each cluster, denoted $r_{ci}$. The representative vertex is peaked such that it minimizes $\Sigma_{\forall i \in c}, |e_{ri}|$, the sum of distances among the selected vertex and other vertices in the cluster, therefore it is considered the center of the cluster. For each of the selected vertices, the maximum distance that other vertices in that cluster have with the chosen representative vertex is computed. This distance is referred to as radius $rd_{ci}$. The set of the vertices (state graphs) and their corresponding radius from each cluster is defined by $\Omega = \{<r_{c1}, rd_{c1}>, \ldots, <r_{cn}, rd_{cn}>\}$, the behavior model. This model is used for online matching of new recorded activities. Any new state graph extracted from a user in the future will be checked against the model to classify the state graph as one of the known behaviors or as abnormal behavior. In this context, the term abnormal behavior means that the extracted state graph does not get classified with any of the state graphs in the known behavior model $\Omega$.

For a given new state graph $G_n$, the dynamics (graph topology) of a candidate state graph $G_n$ is compared with each of the known activity models, which are part of behavior model $r_{ci} \in \Omega$. The new state graph will be classified as a previously known activity if $\varphi(G_{new}, r_{ci}) < rd_{c1}$ (its similarity with the corresponding activity model is less than activity model radius). If the new state graph matches more than one state graph or behavior model, the classification methodology will favor the model which has a closer distance in static properties.

Methodology 2 illustrates an example methodology for real time activity classification.

---
Methodology 2 - real time activity classification
---
1:     Input: Candidate State Graph $C_{candidate}$
2:     Input: Behavior graph $\Omega$ = Set of $r_c$
3:     Output: $c_{result}$ (known/unknown behavior)
4:
5:     Set of matching candidates S = { }
6:     for each $<r_c, rd_c> \in \Omega$ do
7:       if $\varnothing(r_c, C_{candidate}) < rd_c$ then
8:         $S \leftarrow r_c$
9:       end if
10:    end for
11:    if S == ∅ then
12:       $c_{result} \leftarrow c_{candidate}$
13:    end if
14:    $c_{result}$ ← Pick Statically similar $r_c$ from S
---

As new state graphs are classified over time, there will be impacts on the behavior graph. First, the newly added state graphs which are not classified with any of the known behavior models might themselves form a cluster or change cluster boundaries. Second, the representative node of each cluster might not be the center of the cluster anymore. To avoid a negative impact on performance of online classification, the center of each cluster is recalculated, and the whole behavior model is refined. The center of each cluster may be recalculated every time a particular state graph is classified with vertices in that cluster, by computing the most recent added state graph's distance to the rest of the members in the cluster, and adjusting the sum of total distances for each member of the cluster. Even though this is a preferred solution, it can be computationally expensive when the number of vertices grows in each cluster, as is refinement of the whole behavior model. The policy to recompute the center of each cluster and refine the whole behavior model is based on the K number of nodes added to the graph. In the experimental results section, online classification when k is a constant factor chosen as ¼ of initial size of the cluster is evaluated.

EXPERIMENTAL RESULTS

In shoe based sensing system study 1, the sampling rate for the Pedar was set to 50 Hertz (Hz), and the collected data transmitted to a personal computer through a gateway using a Bluetooth-enabled transmitter. Twelve subjects participated in the study, including eight males between the ages 17 and 35, and four females between the ages 20 and 30. Each subject was asked to wear the shoe system for periods of 30 minutes, during which the subject was asked to perform activities including walking, slow walking, running, jumping, walking up stairs, walking down stairs, standing, leaning to the right, leaning to the left, limping on the right foot, and limping on the left foot. Once the data was collected, 24 sensors out of 99 were picked, as shown in FIG. 7. The 24 sensors were selected such that they covered nine regions of interest of the foot: M1 medial heel, M2 lateral heel, M3 medial mid-foot, M4 lateral midfoot, M5 medial forefoot, M6 central forefoot, M7 lateral forefoot, M8 hallux and M9 lesser toes, as well as the center line of pressure progression. Once the test data was collected, the signals were normalized to remove potential DC or low frequency AC bias. Each stream of data was segmented based on consecutive touches of the right foot to the ground. Components were extracted based on four natural signal phases, and a set of principal components identified. A behavior graph was constructed after the topological similarities among state graphs was computed. The created state graphs were clustered to find similar communities. After the clustering, each cluster was examined, and each state graph marked in each cluster with the actual corresponding activity.

Table 1 summarizes the average clustering results for all twelve subjects. As Table 1 suggests, the average precision of 92% and recall of 89% is achieved. Recall is the proportion of class instances that are correctly classified, and precision is the ratio of predicted classes that are correct.

TABLE 1

|  | Walk | Slow walk | Run | Jump | Up Stairs | Down Stairs | Stand | Lean | Limp |
| --- | --- | --- | --- | --- | --- | --- | --- | --- | --- |
| Walk | 91% | 2.5% | 0 | 0 | 3.5% | 0.5% | 0 | 0 | 3.5% |
| Slow walk | 1% | 93% | 0 | 0 | 1.8% | 1.6% | 0 | 0 | 2.6% |
| Run | 0 | 0 | 92% | 0 | 3.7% | 4.3% | 0 | 0 | 0 |
| Jump | 0 | 0 | 0 | 100% | 0 | 0 | 0 | 0 | 0 |
| Up Stairs | 1.8% | 5.7% | 0.9% | 0 | 88.6% | 3% | 0 | 0 | 0 |
| Down Stairs | 4.3% | 2.5% | 5.3% | 0 | 1.6% | 86.3% | 0 | 0 | 0 |
| Stand | 0 | 0 | 0 | 0 | 0 | 0 | 92% | 7% | 0 |
| Lean | 0 | 0 | 0 | 0 | 0 | 0 | 9% | 91% | 0 |
| Limp | 4% | 5.5% | 0 | 0 | 3.5% | 3% | 0 | 0 | 84% |
| Precision | 90% | 84.2% | 94.6% | 100% | 86% | 88.6% | 98% | 93% | 93.9% |
| Recall | 91% | 93% | 92% | 100% | 88.6% | 86.3% | 92% | 91% | 84% |

The constructed clusters can be used as a model to represent a particular user behavior. The advantage of having such a model is that it can be used as a reference point to match new state graphs against the set of known activities and also to identify abnormal activities (activity not seen before). 60% of the data from the known activities (walk, slow walk, run and move up stairs) was used to perform the clustering, and for each of the main clusters (which represent an activity or behavior) the center of the cluster was picked as a model for that particular type of activity, to be part of the behavior model. The remaining 40% of data from those activities (walk, slow walk, run and move up stairs), and all data from the rest of the activities (move down stairs, jump, limp, lean) was used to try to classify the activity (match against representative nodes in behavior model) using a constructed state graph from each segment. Table 2 shows the precision and recall for classified new state graph classification, where normal means that the there is a match for activity and abnormal means there is no match.

TABLE 2

|  | Normal | Abnormal |
| --- | --- | --- |
| Precision | 89% | 85% |
| Recall | 86% | 91.7% |

Table 3 contains the comparison between the proposed unsupervised method with two known supervised techniques and a motif discovery based unsupervised method.

TABLE 3

| Method | Required Preperation | Accuracy |
| --- | --- | --- |
| Bayes Classifier | Manual labeling | ~94% |
| Decision Tree | Set up and training | ~97% |
| Motif Detection | None | ~86% |
| Our Method | None | ~89% |

A Bayes classifier was used to detect activities by training the classifier using a manually trained selected date set. The technique achieved average accuracy of approximately 94%; however, the performance was highly dependent on similar movement patterns used in the training and test data set. Decision tree is based on a set of parameters that are set during initial setup phase for each user by a field expert. Even though it has the highest accuracy, its performance is heavily related to initial set up. The behavior based detection of the present disclosure, and the motif detection based method, can operate without initial labeling, training and per person setup. The technique of the present disclosure achieved higher accuracy compared with the motif detection based methodology. Further, the behavior based detection of the present disclosure generates an activity template which can be used for future recognition, something that the compared unsupervised technique does not produce.

Thus is described a technique for unsupervised discovery of activities and abnormalities in multi-dimensional time series data extracted from wearable systems. A modeling technique was introduced that transforms recorded physiological signals to combinatorial space and takes advantage of combinatorial optimization techniques for clustering, and for recognizing similar activities and identifying abnormalities. Experimental results show the effectiveness of the technique in grouping similar activities, with average 92% and minimum 84.2% for precision, and average 90.8% and minimum 84% for recall. Using the real time matching, it is possible to achieve 89% average precision and 86% average recall for a new activity as a known activity, and 85% average precision and 91.7% average recall for detecting unknown activities.

System Study 2

System study 2 was performed using a personal activity monitor (PAM) system, which is a lightweight portable accelerometer-based motion sensing device. For this study, the PAM was used to monitor and classify gait. The PAM has a triaxial accelerometer, 1 GB of internal memory and a USB interface. The sampling rate as well as the acceleration threshold are adjustable, allowing recording of a variety of data at a variety of resolutions while optimizing energy consumption, thereby increasing the operation lifetime. Time series acceleration data is stored in on-board flash memory. Later, the recorded signals are transferred via USB to a PC, where appropriate processing and analysis take place.

As described with respect to FIG. 6, behavior graphs (e.g., 629) were constructed from time series data representing sensor measurements, and the behavior graphs clustered. Then, activity templates were extracted from each cluster. A signature of each activity template was computed using SimHash. During an investigative stage, a signature of a constructed behavior graph is computed and is used to identify a match with a signature of a known activity template (or abnormality).

An assumption was made for the system study 2 that the accelerometer signal for a step is periodic with a noisy beginning and end. A model was generated based on this assumption as follows.

Figure 15:
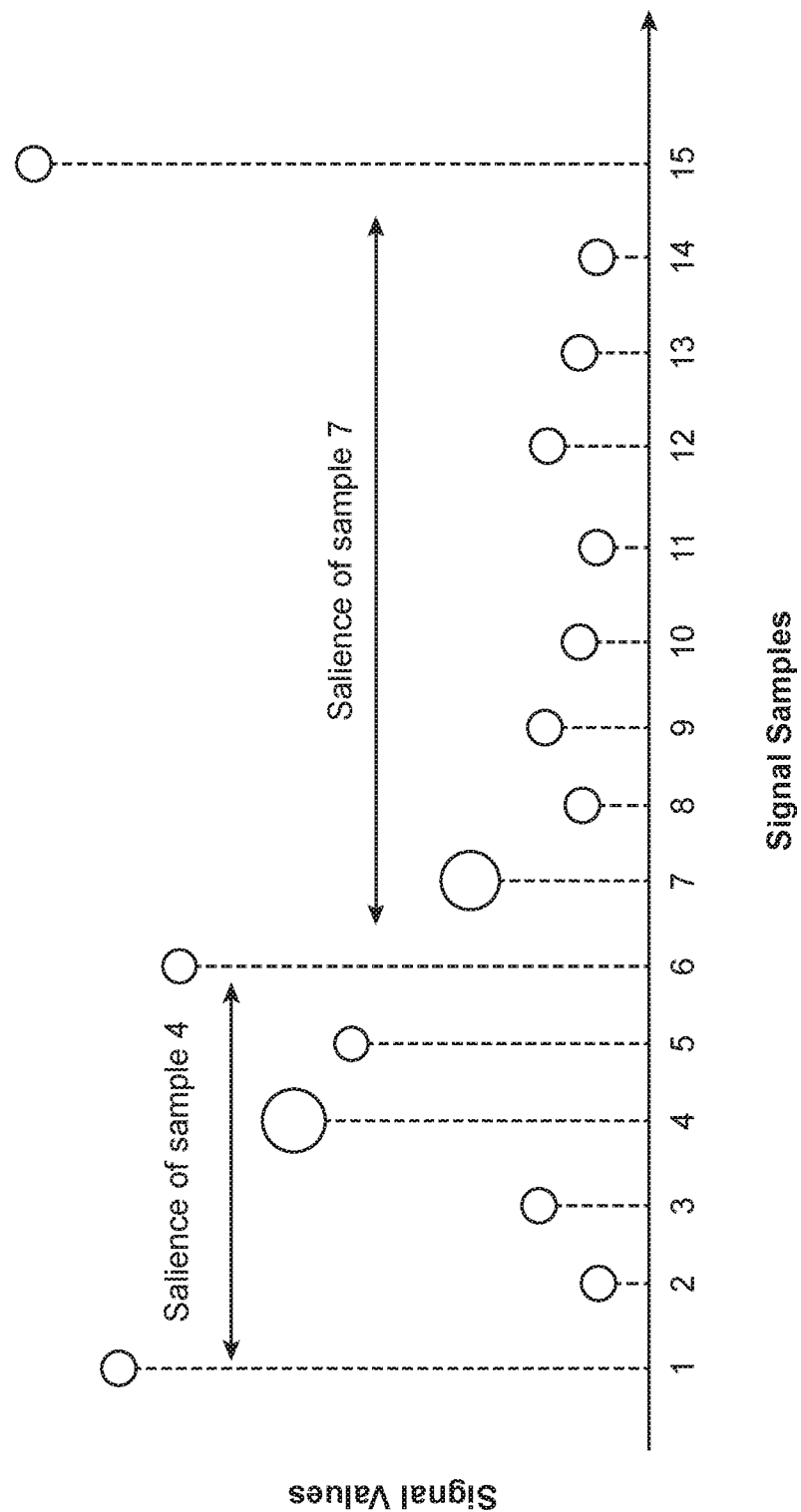
FIG. 15 illustrates an example of salience.

The three axes x, y, z were combined into a single axis denoted as r, using the Euclidean distance, $r = \sqrt{A_X^2 + A_Y^2 + A_Z^2}$. A salience of each acceleration sample point in the input signal r was found. The salience of a given sample is defined as the length of the longest interval over which that sample is a maximum. Therefore, the salience of the global maximum is N, if there is no other sample with the same amplitude. However, a sample with a large salience does not necessarily have a large value and vice versa. FIG. 15 illustrates an example of salience. Consider the fourth sample: despite the fact that it has a higher magnitude than the seventh sample, it has a smaller salience s(4)=4 as compared to the seventh sample s(7)=8. A salience vector represents the resulting signal containing the salience of each sample in the original signal. For the example of FIG. 15, the salience vector is s(k)={14, 1, 2, 4, 1, 13, 8, 1, 4, 2, 1, 5, 2, 1, 15}, 1≤K≤15.

A sliding window approach was used to compute the salience vector, as it offers faster execution time and addresses issues pertaining to the signal's origin. A key property of the salience vector for system study 2 is that the starting point of each step has a large salience. Hence, steps can be found by locating these prominent points. The vector u is computed as u=(r.s)/max(s), where dot (.) represents an element-wise multiplication. The idea behind deriving u is to make peaks of r more pronounced and to diminish the rest of the samples. The elements of u exceeding a certain threshold (e.g., 2.max(u)/3) are next extracted as potential cycle indices. The difference vector, d, between adjacent extracted indices is computed, and elements whose corresponding difference vector values are less than 2 from the potential cycle indices are removed. This elimination phase helps to increase the accuracy of step detection by counting two close peaks only once. Based on the original assumption about the input signal, mean(d) will approximately be the average duration of each step.

Figure 16:
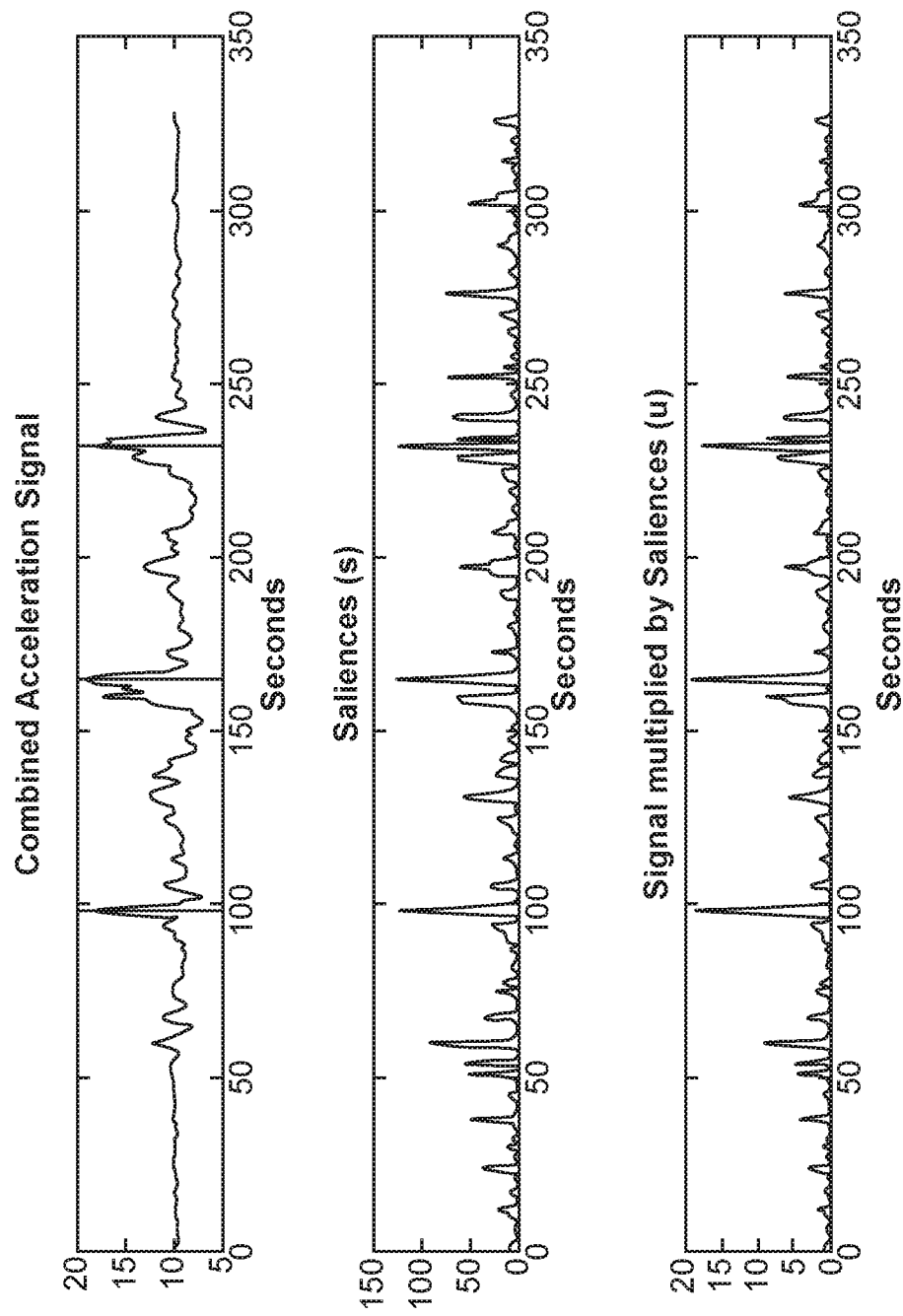
FIG. 16 illustrates the result of the step detection technique on a given time series signal.

Then, d is normalized around its mean and indices of points that fall within this threshold are extracted (i.e., |d−mean(d)|<mean(d)). The number of such points is indicative of the number of steps taken and in fact, such points are the start/end points of each step. FIG. 16 illustrates the result of the step detection technique on a given time series signal. The original signal is shown in the top graph, the signal salience vector is shown in the middle graph, and the salience vector after normalization is shown in the bottom graph.

The multi-dimensional time series signals for each step are transformed into combinatorial space by constructing weighted directed graphs for the chosen time interval (state graph). Each vertex $v_i$ in a state graph is a pair of a sensor as the source of the data and a component. Edges in this graph are defined according to equation 7, where τ is the precedence of a component's appearance in the considered time interval, and the weight associated with each edge $e_{uv}$ is defined according to equation 8.

$$e_{uv} \in E_T \Leftrightarrow \tau(v_i) - \tau(v_j) < 0 \qquad (7)$$

$$w_{e_{uv}} = \tau(v_j) - \tau(v_i) \qquad (8)$$

To group similar state graphs that are representative of a particular pattern or activity, a behavior graph $Gb = (V_b, E_b)$ is constructed. Each vertex $v_i \in V_b$ is a constructed state graph. There exists an edge $e_{ij}$ between two vertices $v_i$ and $v_j$ if their corresponding state graphs $G_a$ and $G_b$ do not have contradicting edges. A weight associated with each edge $w_{ij}$ is a similarity measure between connecting state graphs $G_a$ and $G_b$. Weight $w_{ij}$ is defined in equation 9, where $E_a$ and $E_b$ are sets of edges, and $w_e^a$ and $w_e^b$ are the weights associated with each of the corresponding edges in graphs $G_a$ and $G_b$.

$$w_{ij} = \phi(G_a, G_b) = \frac{1}{|E_a \cup E_b|} \sum_{e \in E_a \cup E_b} \frac{1 - |\Delta w_e^{ab}|}{(|w_e^a| + |w_e^b|)/2} \qquad (9)$$

As equation 5 suggests, state graphs that have higher number of consistent edges will have closer distance, therefore, higher similarity. By clustering the vertices (state graphs) in behavior graph, similar segments of data are grouped. The state graphs that end up in the same cluster will have the similar pattern, hence, they can be considered similar type of activity. Furthermore, the vertices that are not member of any cluster (outliers) will be considered as abnormal behavior.

A community finding technique was used to cluster similar behavior (state graphs) in a behavior graph. This technique uses an effective grouping measure called modularity, which measures meaningfulness of a particular division of the network. Modularity is defined as the fraction of edges that fall within communities minus the expected value of the same quantity of edges if they fall at random regardless of the community structure. The modularity formulation for the behavior graph was defined as in equation 10, where Q is the modularity, $W_{ij}$ is an adjacency matrix with weight of connection from i to j, and $E_b$ is the set of edges in the behavior graph, $k_i$ and $k_j$ are degrees of vertices and σ(i, j) is a function, which has value of 1 if i=j and zero otherwise.

$$Q = \frac{1}{|E_b|} \sum_{\forall ij} \left[ W_{ij} - \frac{k_i k_j}{2|E_b|^2} \right] \sigma(c_i, c_j) \qquad (10)$$

According to equation 10, large values of Q indicate the existence of good community division, therefore, the problem of clustering the graph becomes maximizing Q over all possible divisions. Starting with a state in which each vertex is the sole member of one of n communities, this technique joins pairs of communities that have connecting edges, and in each calculation chooses the result that causes smallest decrease or greatest increase in Q.

After clustering, the vertices in the behavior graph are either members of a formed cluster or they are left singled out. Each of the clusters are representative of a known activity, while vertices that are not a member of any cluster are abnormalities, in the sense that they are rare events and have not happened frequently. To classify patterns from newly recorded signals as previously known activities or abnormalities, a representative state graph is selected for each known cluster, and all vertices that are not a member of any cluster are also selected, to cover both known and rare activities. Each representative state graph is selected such that it minimizes a sum of distances among the vertices in the cluster, hence it is considered the center of the cluster. This is demonstrated in equation 11, where $C_i$ is the vertex i in cluster C and distance $i_r$ is the distance between vertex i and representative vertex r in the cluster.

$$\text{minimize}\left(\sum_{\forall i \in C_i} |distance_{ri}|\right) \quad (11)$$

The set of the representative vertices of each cluster and vertices that are not a member of any cluster is defined by $\Omega=\{RC_1, RC_2, \ldots, RC_n, V_{O1}, V_{O2}, V_{O3}\}$, where $RC_i$ is the representative element of cluster i and $V_{Oj}$ is the j-th vertex, which is not a member of any formed cluster. The set $\Omega$ is the behavior model. The model is used to provide fast and real time online matching. Any new state graph extracted from data in the future will be checked against its model to classify as one of the known behaviors or as abnormal behavior.

For a given state graph $G_n$, the graph is compared to each of the known behavior models, to be able to classify the candidate state graph either as a known behavior or an abnormal behavior. To do this, the following points are addressed: 1. For a given state graph find the most similar template in behavior model $\Omega$. 2. For a given state graph, if it is similar to a previously seen unknown template then reconcile them to a single template in behavior model $\Omega$. Because state graphs, both new and members of $\Omega$, can potentially have very large number of highly connected vertices, comparing them to find similarity can be solved through graph isomorphism, which is a known NP problem, or by using a similarity function such as in equation 9. Both of these approaches will not scale if the number of elements in $\Omega$, the behavior model, or the number of vertices in the state graph increases, since in the best case each incoming stage graph is compared against all behavior models. A locality sensitive hashing based technique was used in this study to address this problem, as is described below.

The signature based similarity is based on a rule that two objects can be considered similar if their signatures are similar. Instead of comparing graphs directly, each graph is represented with a set of features which are randomly projected into a space with smaller dimension for comparison. In this study SimHash was used. The main challenge using SimHash was in converting state graphs to an appropriate set of features to be able to use as input in the SimHash algorithm. The state graph G is transformed to a set of weighted features $F=\{(t_{ei}, w_i)\}$, where $t_{ei}$ is a token representing the two vertices that have connecting edges in G and $w_i$ is the weight associated with the edge. It is important to note that each token appears only once in the graph. The constructed weighted set F is a multidimensional vector, where the dimension of the vector space is defined by distinct edges that can be found across different state graphs. This set is an input to the SimHash technique to get an m-bit fingerprint of the set as follows. An m-dimensional vector V is maintained, and each of its dimensions is initialized to zero. Each feature in F is hashed in to an m-bit value. For the resultant m-bits for each feature, increment/decrement the m components of V by weight of the feature. If the i-th bit of the resulting hash value is 0, then the i-th component of V is decremented by the weight associated with that feature. If the i-th bit of the resulting hash value is 1, then i-th component of V is incremented by the weight associated with that feature. When all features of F are processed (e.g., are hashed and the associated weight is applied), some components of V will have a positive value and some will have a negative value. The final fingerprint of the state graph is determined by values of components in V. To obtain the final fingerprint we replace positive values in V with 1 and negative values with 0. Accordingly, SimHash is a technique that estimates similarity between weighted sets F and F' by considering the Hamming distance of their respective generated fingerprints V and V' as in equation 12, where Hamming (V,V') is the number of bits in V and V' in which the values are different.

$$\text{Similarity}(F, F') = 1 - \frac{Hamming(V, V')}{m} \quad (12)$$

Figure 17:
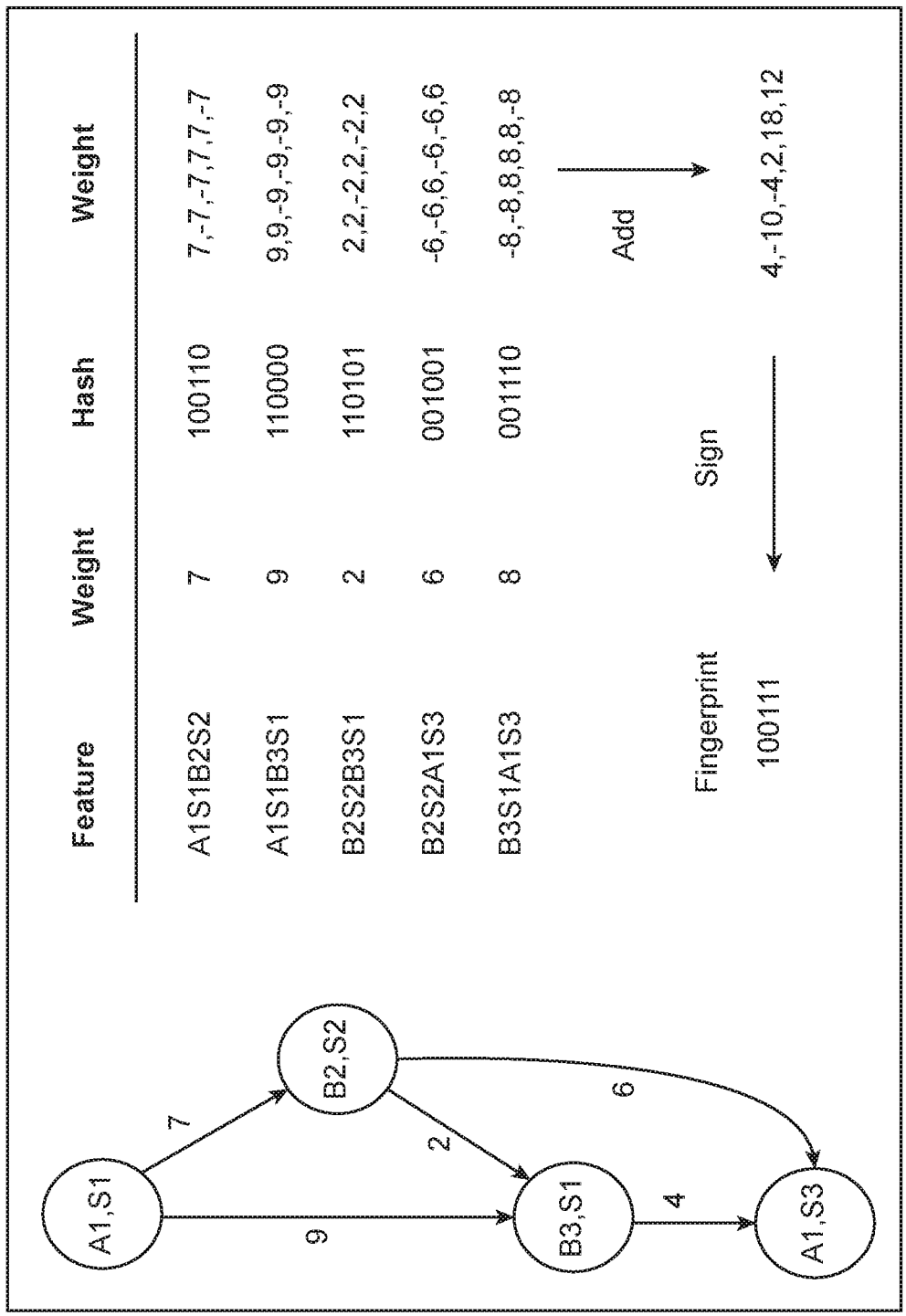
FIG. 17 is an example of using SimHash on a state graph.

An example of using SimHash on a state graph is illustrated in FIG. 17. Using SimHash to estimate similarity among state graphs presents the following two properties: 1. The fingerprint of a state graph is the hash of its features. 2. Similar state graphs have similar hash values. (It is important to note that this is not a typical property of regular hash function such as MD4 or SHA-1 and only holds for a class of hash functions called locality sensitive hashing (LSH)).

To classify a given state graph $G_n$ with any of the known clusters C or abnormality A the following parameters are taken into consideration. First, for each formed cluster $C_i$ the center of the cluster is computed by considering the distance between each two pair of vertices in the cluster using equation 12 as described above. The vertex representing the center of the cluster i is denoted $r_{ci}$. In addition, a cluster diameter is computed. Cluster diameter, presented as $k_{ci}$, is defined as the number of bit differences that the fingerprint of the vertex representing the center of the cluster has compared to the fingerprint of the vertex that has a largest distance from the center of the cluster. For each cluster, the number of elements in the cluster, or $|C_i|$, is considered. The known activity template (KAT) for each cluster is constructed as KAT=$\{<r_{ci}, k_{ci}, |C_i|>\}$, AND the unknown set of activities (UAT) is identified, which contains vertices that are not part of any cluster. For a given state graph, the fingerprint of the candidate state graph is constructed and used to compare against members of KATs. If the distance between a candidate state graph and a KAT (computed using equation 12) is less than the diameter associated with that KAT, then the candidate state graph will be classified as the same type of the activity that the KAT represents. It is possible that a candidate state graph satisfies the diameter condition of multiple KATs, in which case a probability of match is assigned for the candidate state graph to each of the corresponding templates. The assigned probability is proportional to the distance that the candidate state graph has from the corresponding KAT. If there is not a KAT match, the candidate state graph is compared against members of the UAT, or against members of abnormal activity templates (AATs).

A hash table based implementation was used to find similar templates whose fingerprint is different from candidate state graph fingerprint by at most $k_b$-bits. If the returned results are more than $|C_s|/4$, then matched templates are grouped with candidate state graphs to form a new cluster, and parameters extracted from the newly formed cluster added to a KAT for future matches. The following Methodology 3 summarizes the steps taken for recognition and classification.

| Methodology 3 - online state graph classification |
|---|
| 1: Input: Candidate State Graph $C_{candidate}$ |
| 2: Input: $Set_{K\,AT}$ and $Set_{U\,AT}$ |
| 3: Output: Set of $C_{result}$ or U N K N O W N |
| 4: Set of matching candidates S = { } |
| 5: for each $< r_c, k_c, |C| > \in Set_{K\,AT}$ do |
| 6:    if distance($r_c$, $C_{candidate}$) <= $k_c$ then |
| 7:       S ← $r_c$ |
| 8:    end if |
| 9: end for |
| 10: If |S| > 1 then |
| 11:    assign matching probability for each $r_c \in S$ |
| 12: else |
| 13:    $min_{diameter}$ = min($K_c$) $\in Set_{K\,AT}$ |
| 14:    $min_{size}$ = min(|C|) $\in Set_{K\,AT}$ |
| 15:    Set of matching unknown activities MU A = { } |
| 16:    fp = FingerPrint($C_{candidate}$) |
| 17:    MU A = { } ← FindElements(MU A, fp, $min_{diameter}$) |
| 18:    If |MU A| >= $min_{size}$/4 then |
| 19:       $Set_{K\,AT}$ ← ActivityTemplate(MU A) |
| 20:       S ← ActivityTemplate(MU A) |
| 21:    end if |
| 22: end if |

EXPERIMENTAL RESULTS

Methodology 3 was evaluated on data collected from 15 subjects between age of 18 to 40. The gender of the subjects was not known to maintain privacy. The subjects were classified in three categories. Category one included patients in recovery from interior cruciate ligament (ACL) injuries. Category two included patients who had ankle strains. Patients in category one and category two were in an initial phase of recovery. The third category included people with no injury. PAM was used for data collection, attached to three sections of each subject's body. The data is collected from each subject during weekly exercise, 4 sessions per subject. The data collected was transferred out of PAM devices after each session. The PAM devices do not have a synchronized mechanism to turn on and off, or enable and disable data logging. Thus, the PAM devices were turned on and off manually by pressing a button on each PAM device. After data is transferred out of the PAM device for analysis, the data was aligned from 18 accelerometer channels. The accuracy of the signal alignment and step detection was verified. After segmenting the recorded multi-dimensional time series data, the state graph for each segment was constructed. The topological similarity of each segment was constructed, and a behavior graph constructed. Similar communities of state graphs were clustered. Each state graph in each cluster was marked with the corresponding patient type. Table 4 summarizes the average clustering results for the 15 subjects.

The constructed clusters were used as a model to represent a particular condition. The advantage of having such a model is that it can be used as a reference to match a new condition against the sets of known conditions and identify abnormal conditions. A portion of the data gathered in the study was used to create a model, and a portion (35%) used to test the efficacy of the model. The model was created from 65% of the data, which was related to known condition types (no injury and ACL injury): for each of cluster, parameters were extracted, KATs constructed for the known activities, and a set of state graphs constructed for unknown activities. The remaining 35% of the data was then classified based on the model. Table 5 shows the precision and recall for classified new state graphs, where normal means that there is a match for the activity and abnormal means there is no match.

TABLE 4

Confusion matrix showing average classification accuracy for 15 subjects

|  | Normal | ACL Injury | Ankle Strains |
|---|---|---|---|
| Normal | 94% | 4% | 2% |
| ACL Injury | 6.4% | 86% | 7.6% |
| Ankle Strains | 5.8% | 6.2% | 88% |
| Precision | 87.8% | 89.8% | 90.4% |
| Recall | 94% | 86% | 88% |

TABLE 5

Classification precision and recall for new state graphs

|  | Normal | Abnormal |
|---|---|---|
| Precision | 87% | 84% |
| Recall | 83.6% | 82% |

As used herein, the terms "substantially," "substantial," "approximately" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and the drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations.

What is claimed is:

1. A system, comprising:
an interface configured to receive first time series data representing information from a plurality of sensors;
a processor configured to construct a behavior model by executing unsupervised machine learning based on the first time series data as training data, wherein the processor constructs the behavior model by executing instructions to:
identify features in the first time series data;
divide the first time series data of each of the identified features into segments;
extract feature components from the segments;
construct a plurality of state graphs, each state graph including components connected by weighted edges;
construct a behavior graph, wherein the state graphs form vertices of the behavior graph;
cluster the state graphs in the behavior graph; and
select a representative state graph from each cluster, wherein the behavior model includes the selected state graphs,
wherein the processor is further configured to receive second time series data and identify a performed motion by comparing a state graph constructed from the second time series data to the behavior model.

2. The system of claim 1, wherein the time series data from the plurality of sensors represents data from a plurality of wearable sensors.

3. The system of claim 2, wherein the time series data represents body movement.

4. The system of claim 3, wherein the segments of the time series data include time intervals representing foot motion states of airborne, grounded, takeoff and landing.

5. The system of claim 4, wherein the feature components include at least one of maximum applied pressure or progression of applied pressure.

6. The system of claim 1, wherein the sensors are a first set of sensors; and the second time series data are received from a plurality of second sensors.

7. The system of claim 1, wherein to construct the state graphs includes to determine similarities between components, and assign a weight to an edge between two components based on a similarity value between the two components.

8. The system of claim 1, wherein the selected state graphs are vertices of the behavior model.

9. The system of claim 1, further comprising identifying a group of classes representing the behavior model.

10. The system of claim 9, wherein each class represents a known motion.

11. A method, comprising:
training a prediction model by executing unsupervised machine learning, comprising
receiving time series data representing information from multiple sensors;
identifying features in the time series data;
extracting components of the features;
identifying similarities between the components;
constructing state graphs, each state graph including similar components;
constructing a behavior graph of similar state graphs;
organizing the state graphs in the behavior graph into clusters; and
selecting a representative state graph from each cluster, the representative state graphs constructing the prediction model; and
predicting a behavioral or physiological condition based on the prediction model.

12. The method of claim 11, wherein executing unsupervised machine learning further comprises assigning a class to each representative state graph.

13. The method of claim 12, wherein each class represents one of a known motion or an identified abnormal motion.

14. The method of claim 11, further comprising receiving real-time sensor data; constructing a real-time state graph from the real-time sensor data; and identifying a known motion by comparing the real-time state graph to state graphs of the behavior graph.

15. The method of claim 11, wherein the time series data represents measurements from multiple subjects.

16. The method of claim 11, wherein the time series data represents measurements from one subject.

17. The method of claim 11, wherein executing unsupervised machine learning further comprises identifying principal components of the extracted components, and constructing the state graph based on the principal components.

18. The method of claim 11, wherein extracting components includes determining salience vectors to describe the time series data.

19. The method of claim 11, wherein the time series data represents pressure sensors in a shoe, and the model represents gait.

* * * * *